(12) United States Patent
NewDelman et al.

(10) Patent No.: US 12,396,383 B2
(45) Date of Patent: Aug. 26, 2025

(54) SUB-SURFACE INJECTION SYSTEM FOR SUBSURFACE BLENDING AND HORIZON CREATION

(71) Applicant: SUB-MERGENT TECHNOLOGIES, INC., Lake Oswego, OR (US)

(72) Inventors: Mitchell J. NewDelman, Monte Carlo (MC); John A. Sanders, Austin, TX (US)

(73) Assignee: Sub-Mergent Technologies, Inc., Southlake, TX (US)

( * ) Notice: Subject to any disclaimer, the term of this patent is extended or adjusted under 35 U.S.C. 154(b) by 617 days.

(21) Appl. No.: 17/872,009

(22) Filed: Jul. 25, 2022

(65) Prior Publication Data
US 2024/0023477 A1    Jan. 25, 2024

(51) Int. Cl.
*A01C 15/00* (2006.01)
*A01C 5/04* (2006.01)
(Continued)

(52) U.S. Cl.
CPC ............ *A01C 5/04* (2013.01); *A01C 15/00* (2013.01); *A01M 21/02* (2013.01); *G05B 19/042* (2013.01); *G05B 2219/2625* (2013.01)

(58) Field of Classification Search
CPC ................. A01C 15/00; A01C 5/04
See application file for complete search history.

(56) References Cited

U.S. PATENT DOCUMENTS 3,136,274 A * 6/1964 Townsend ............ A01B 45/023
111/31
10,070,572 B2 * 9/2018 De Bree ............. A01B 45/023
(Continued)

FOREIGN PATENT DOCUMENTS

CA      2705585 A1 *  6/2009  ............. A61M 5/30
CN    104541713 A  *  4/2015
(Continued)

*Primary Examiner* — Jamie L McGowan
(74) *Attorney, Agent, or Firm* — Bailey Legal Services, PLLC

(57) ABSTRACT

A sub-surface injection system for subsurface blending and horizon creation includes wings (105B, 519A, 511C, 513C, 519C), partially actuated mixing wings (205B, 309A, 411C, 419C, 511A, 519A, 511B, 513B, and 521B), an electromagnet, AI robot (1107C), lens (1205), computer (111C), a PLC (1105C), encoder (1305B), limit switch (1409B), and a GPS (1113C). The wings (105B) are actuated by the electromagnet. The wings (105B) include blades (911B, 913B, and 915B), the partially actuated mixing wings (513B) during descension and/or ascension, and industrial diamonds or blades to cut through sub-surface impediments. The wings (105B, 519A, 511C, 513C, 519C) are controlled by the A1 robot (1107C), the lens (1205), the computer (1111C), the PLC (1105C), the encoder (1305B), the limit switch (1409B), and the sensor. The wings (511C, 513C, 519C) exist within a below portion or an above portion of a hollow shaft drilling array and are individually controlled by one or more of the AI robot (1107C), lens (1205), computer (1111C), PLC (1105C), encoder (1305B), limit switch (1409B)}, and the sensor. The wings (511C) include a secondary deployable blade to enhance cutting or reaming through an impediment comprising clays and rack. The wings (519A) integrate sensors based on Lidar technology. The sensors receive commands and signals from the Al robot (1107C), the lens (1205), computer (1111C), PLC (1105C), encoder (13058), and the limit switch (1409B). The wings (105B, 519A. 511C, 513C, 519C) are deployed based on the data about soil type and amendment prescription received from the GPS (1113C).

36 Claims, 16 Drawing Sheets

(51) Int. Cl.
    *A01M 21/02*         (2006.01)
    *G05B 19/042*      (2006.01)

(56) References Cited

U.S. PATENT DOCUMENTS

| | | | | |
|---|---|---|---|---|
| 2020/0296875 | A1* | 9/2020 | Calleija | A01M 21/04 |
| 2022/0232759 | A1* | 7/2022 | Sauder | A01C 23/042 |
| 2023/0309472 | A1* | 10/2023 | Sanders | A01C 23/042 |
| | | | | 700/284 |
| 2023/0397516 | A1* | 12/2023 | NewDelman | A01B 49/065 |
| 2024/0023477 | A1* | 1/2024 | NewDelman | A01C 5/04 |

FOREIGN PATENT DOCUMENTS

| | | | | | |
|---|---|---|---|---|---|
| DE | 4028996 | A1 * | 3/1992 | | |
| EP | 1203522 | A1 * | 5/2002 | | A01B 45/023 |
| WO | WO-2017132692 | A1 * | 8/2017 | | A23K 10/18 |
| WO | WO-2020020890 | A1 * | 1/2020 | | A01N 25/08 |

\* cited by examiner

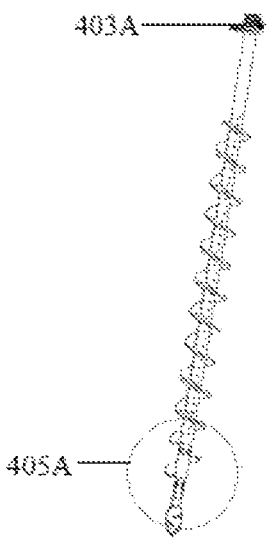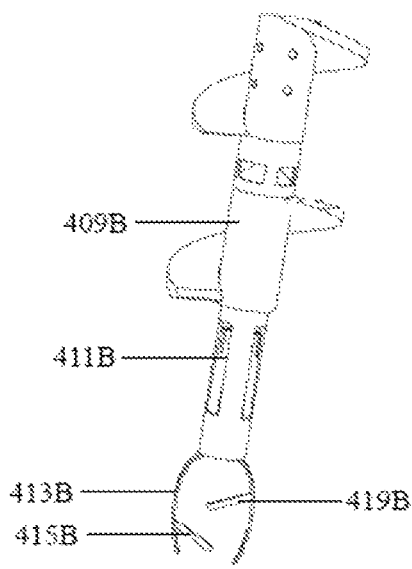
Figure 4A  Figure 4B
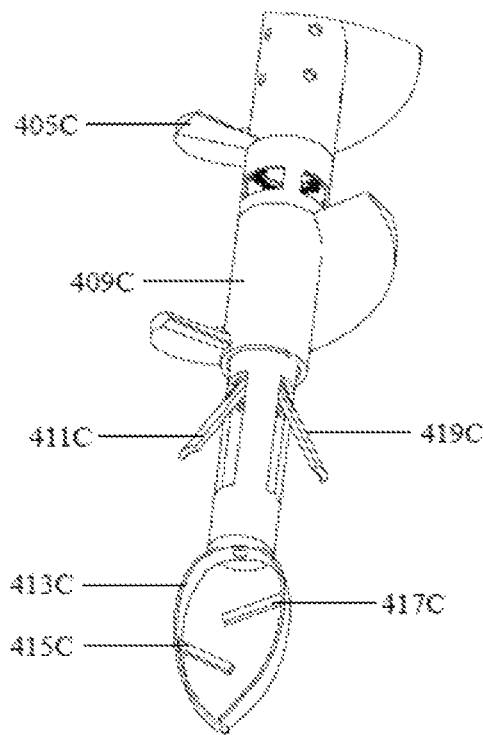
Figure 4C

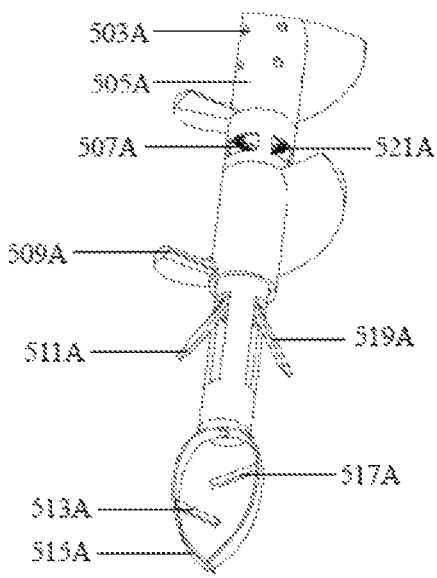
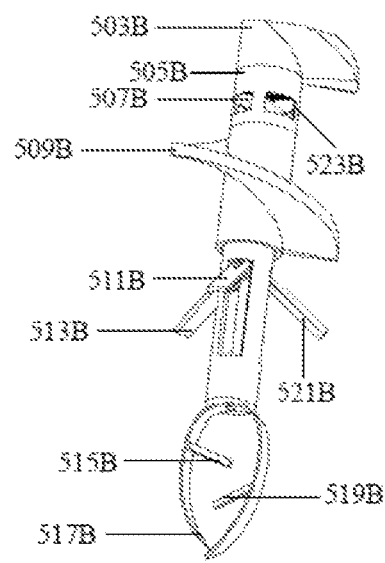
Figure 5A    Figure 5B
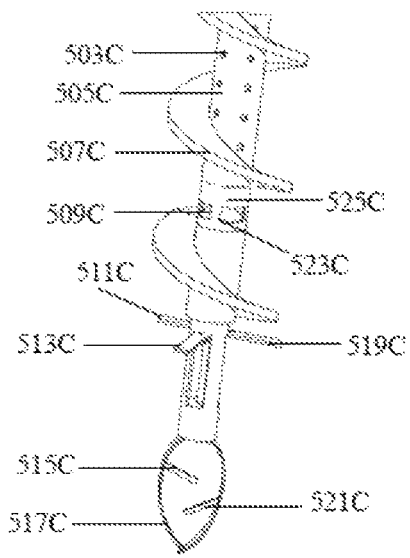
Figure 5C

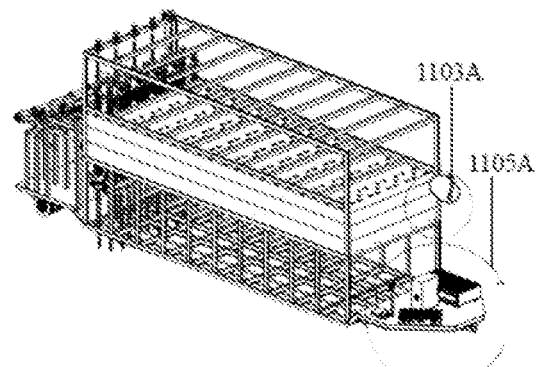
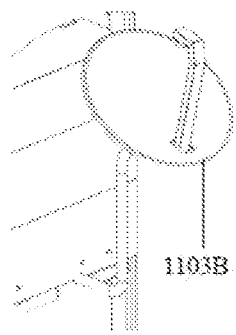
Figure 11A  Figure 11B
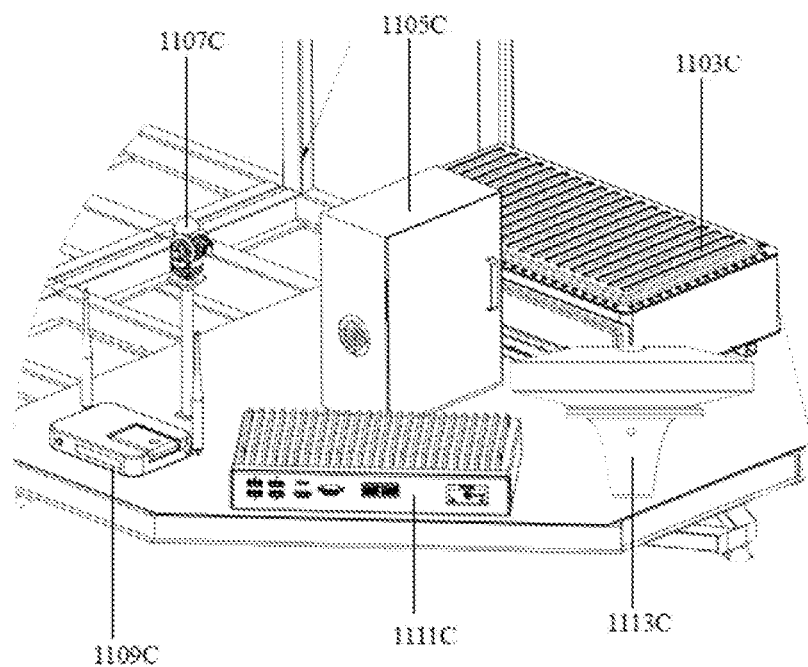
Figure 11C

SUB-SURFACE INJECTION SYSTEM FOR SUBSURFACE BLENDING AND HORIZON CREATION

TECHNICAL FIELD

The present invention is generally related to subsurface blending and or horizon creation through a sub-surface injection system. More particularly, the present disclosure relates to a sub-surface injection system for subsurface blending and horizon creation.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

With an expected world population of 9 billion by 2050, the need to produce more food and fiber is urgent. Irrigated agriculture is more productive, yet large amounts of water are required to maintain maximum yields. Agricultural science strives to improve irrigation management to minimize water inputs while optimizing crop productivity.

Innovative irrigation management could help avoid negative environmental and economic consequences of over- or under-irrigation. Under irrigation affects crop quality and yield. Over-irrigation increases topsoil erosion and the potential of property contamination due to chemical flows. Water resource depletion could consequently increase a region's susceptibility to drought. Non-optimal irrigation can provoke losses to growers, to the local community, and hence, food security.

Optimally efficient irrigation is a function of soil water status across the root zone. Prescribed soil amendment materials, either organic/in-organic and/or non-organic matter, can be injected either for soil health or for water retention.

This specification recognizes that there is a need for an efficient apparatus that can inject down to various targeted root zone sections and/or at sub-rootzone soil horizons for soil health and hence enhanced yield and/or for water retention modification for drought resilience.

Soil amendments applying biochar of many varieties have been examined for crop yield and quality as well as for regulating nitrogen level imbalances due to increased fertilizer use, for pesticide dosage, etcetera.

It is known that locally produced biochar can improve the physical condition of light-textured soils important for crop growth through increased soil aggregate stability, porosity, and available water contents where it reduced soil bulk density. Reduced bulk density due to soil aggregation may aid root growth with more water available. Biochar application to highly weathered and sandy soils will, therefore, increase the soils' resilience against drought.

There is an ever-increasing array of discrete amendments being tried to enhance soil health and/or productivity at the surface or near-surface soil horizons, as well as some rudimentary soil health amendment spiking of soils. When referencing biochar or other soil amendment application rates, the literature discusses topsoil spreading and sometimes mechanical blending down as far as 30 centimeters with surface disruption; but there are no references exist in the art to provide multiple targeted releases through injection at and below the root zone with minimal surface disruption.

In multiple conversations with soil scientists, it is common knowledge that most soil amendments will perform their respective soil health roles better if blended with the existing soils being amended. Co-application of several soil health constituents also seems to yield benefits.

European patent application EP1203522A1 filed by Hargreaves Jonathan William et al. discloses Ground injection, e.g., aeration, apparatus adapted to be mounted on or drawn by a tractor and comprising one or more tines reciprocated vertically by a crank and crankshaft-driven from a motor. Each tine defines an internal passage with outlet apertures. A piston rod connected to each tine and a cylinder has a piston that forces air into a reservoir and via a line into the passage. The mechanism is timed such that a pulse of air is injected into the ground through outlet apertures at the position of maximum penetration of the ground by each tine. Instead of air, a liquid or other gaseous substance may be injected into the ground where it is penetrated by each tine. The apparatus may include two or more rows of such tines and associated injection means.

A PCT application WO 2020/020890 A1 filed by Reid Brian J et al. discloses a solid dosage form comprising biochar and at least one pesticide and/or at least one antimicrobial, wherein said biochar and said at least one pesticide and/or said at least one antimicrobial is homogeneously mixed in said dosage form and said dosage form does not have a layered structure. The invention also provides a method for preparing the dosage form, a liquid composition comprising the dosage form, and a method of controlling pests using the dosage form.

However, none of these prior arts talk about targeted injection(s) at or below the horizon A and or below 30 cm from the surface.

The present specification further recognizes that there is a need for blending soil amendment materials below the root zone and/or at desired targeted zones along the sub-surface root zone that does not currently exist. There is a further need for an efficient and cost-effective sub-surface injection system for subsurface blending and horizon creation.

There is an ever-increasing array of discrete amendments being tried to enhance soil health and/or productivity at the surface or near-surface soil horizons, as well as some rudimentary soil amendment spiking of soils.

Thus, in view of the above, there is a long-felt need in the industry to address the aforementioned deficiencies and inadequacies.

Further limitations and disadvantages of conventional and traditional approaches will become apparent to one having skill in the art through comparison of described systems with some aspects of the present disclosure, as set forth in the remainder of the present application and with reference to the drawings.

SUMMARY OF THE INVENTION

A sub-surface injection system for subsurface blending and horizon creation is provided substantially, as shown in and/or described in connection with at least one of the figures, as set forth more completely in the claims.

An aspect of the present disclosure relates to a sub-surface injection system for subsurface blending and horizon creation. The sub-surface injection system includes a plurality of wings, a plurality of partially actuated mixing wings, an electromagnet, an artificial intelligence (AI) robot, a lens, a computer, a programmable logic controller (PLC), an encoder, a limit switch, and a Global Positioning System (GPS). The wings are actuated by the electromagnet. The wings include a plurality of blades, the partially actuated mixing wings during descension and/or ascension, and a plurality of industrial diamonds or blades to cut through sub-surface impediments comprising one or more of a plurality of invasive species live roots, dead roots, hardened soil, clays, and rocks. The wings are controlled by the artificial intelligence (AI) robot, the lens, the computer, the PLC, the encoder, the limit switch, and the sensor. The wings exist within a below portion or an above portion of a hollow shaft drilling array and are individually controlled by one or more of the artificial intelligence (AI) robot, the lens, the computer, the PLC, the encoder, the limit switch, and the sensor. The wings include a secondary deployable blade to enhance cutting or reaming through an impediment comprising clays and rock. The wings integrate a plurality of sensors based on Lidar technology. The sensors receive commands and signals from the AI robot, the lens, the computer, PLC, the encoder, and the limit switch. The wings are deployed based on the data about soil type and amendment prescription received from the GPS.

In an aspect, the wings are partially deployable at angles less than 180 degrees to blend material within a smaller circumferential sub-surface soil horizon.

In an aspect, the wings are fully deployable at angles of 180 degrees to blend material within a smaller circumferential sub-surface soil horizon.

In an aspect, the wings are deployed at certain prescriptive depths and then retracted before ascension.

In an aspect, the wings are deployed at certain prescriptive depths and then retracted upon surface achievement.

In an aspect, the wings enable continuous mixing of constituents with soil.

In an aspect, the wings are deployed at any sub-surface depth descending.

In an aspect, the wings are retracted at any sub-surface depth as a hollow shaft injection drill bit descends.

In an aspect, the wings retracted at any sub-surface depth as the hollow shaft injection drill bit ascends.

In an aspect, the wings are extended at any sub-surface depth as the hollow shaft injection drill bit ascends, wherein ascension starts at one or more non-actuated mixing wings, then proceeds to the partially actuated mixing wings, and then fully extended at the wings.

In an aspect, the non-actuated mixing wings are disabled within an array when in proximity to a known root zone or a Lidar map communicated from the GPS coordinates in concert with the AI robot and the lens, the computer and the PLC, the encoder, the limit switch and the sensor.

In an aspect, the wings change the densities of soil to positively affect the yield by mixing different dispensed bulk density constituents.

In an aspect, the wings perform mixing a change in the porosity and the soil gravimetric profile occurs by adding a Constituent that has substantially less bulk density and subsequent.

In an aspect, the wings perform mixing of the constituents and soil to create ideal soil bulk densities. In this case, the mixing would be done with wings that do not cut—dull wings—no diamonds.

In an aspect, the wings are fully extended to enable mixing for the maximum area between injection drill bits.

In an aspect, the wings enable blending by ejection of material from an aperture or a cap and rising above the material and then descending back to the depth of strata with the wings or the partially actuated mixing wings during descent.

In an aspect, the wings enable blending by ejection of material from the aperture or the cap and descending below the material, and then ascending back to the depth of strata with the wings or the partially actuated mixing wings during ascension.

In an aspect, the wings enable partially actuated mixing wings to control the sub-surface area being treated within a specific depth.

In an aspect, the non-actuated mixing wings are retracted when live material is injected, by way of example but not limitation earthworms.

In an aspect, the partially actuated mixing wings are partially deployed to be less destructive of injectable live organisms.

In an aspect, the partially actuated mixing wings enable the mixing of organic matter with other constituents for soil nutrient efficacy.

In an aspect, the non-actuated mixing wings are deployed and retracted at desired depths and applying signals from the (AI) robot, the lens, the computer, the PLC, the encoder, and the limit switch to command the dispensing mechanism to reduce or increase the volumes of one or more constituents to be mixed and or blended.

In an aspect, the partially actuated mixing wings are partially deployed so the circumferential area is less to mitigate root damage.

In an aspect, the wings enable the prevention of smearing through the distribution of abrasive organic matter.

In an aspect, the wings enable discrete root ball destruction of unwanted, invasive, or nuisance plants or trees, such as certain Juniper tree species.

In an aspect, the wings enable the addition of the constituents with multiple injections by deployment and retraction of wings at desired depths and applying signals from the (AI) robot, the lens, the computer, the PLC, the encoder, and the limit switch to command the dispensing mechanism to increase the volumes of the constituents to be mixed and blended.

In an aspect, the wings enable eco-colonization of the living constituents comprising microbial colonies and fungi by dispersal within an extended diameter of the core injection.

In an aspect, the wings exploit variable rotational speeds of wings through the signals from the (AI) robot, the lens, the computer, the PLC, the encoder, and the limit switch.

In an aspect, the wings blend, stir, entrain and agitate utilizing ascension of the hollow shaft injection drill bit and then descending the constituents with soil at that sub-surface depth.

In an aspect, the partially actuated mixing wings enable universal and uniform sub-surface distribution of constituents vertically and horizontally.

In an aspect, the wings enable the exploitation of a singular or multiple fixed-wing(s) to mix or blend constituents into soils.

In an aspect, the partially actuated mixing wings change soil porosity modification as a function of the shape and size of solid constituents by mixing aggregates affecting the bulk mass density of the targeted horizon.

In an aspect, the non-actuated mixing wings are retracted before injection of living constituents comprising aneic earthworms to improve porosity by penetrating below sub-soil.

In an aspect, the wings mix organic matter such as leaves subsurface for food and then retracted the non-actuated mixing wings before injection of the living constituents.

In an aspect, the wings are deployed via the encoder revolutions per minute resistance, sensor, AI robot and lens, computer and the PLC utilizes a database of soil type porosity and tightness dynamically interpreting resistance to the hollow shaft injection drill bit to initiate wings deployment to mitigate obstacle.

In an aspect, the sub-surface injection system includes a plurality of bayonet mixing wings for mixing in looser soils that may reside within or on the exterior of a bayonet and another drill bit type.

In an aspect, the present invention provides a method of subsurface mixing of constituents by actuated wings within specific soil strata or depths with different constituent volumes, timed interval releases, controlled by an AI robot, computer, PLC, and or Sensors, through injection drill shafts which have a device with primary and secondary wings partially or fully deployable or fixed at any depth and or degree thereby determining the perimeter and its shape from x, y and z planes.

Accordingly, one advantage of the present invention is that it provides an injection within a four-inch diameter hollow shaft and subsequent deployment of wings with a length of eight inches can blend material within a twenty-inch circumferential sub-surface soil horizon.

Accordingly, one advantage of the present invention is that it facilitates access to sub-root zone horizons as potential massive carbon sinks for certifiable carbon sequestration.

Accordingly, one advantage of the present invention is that it provides partially deployable wings at angles less than 90 degrees to blend material within a smaller circumferential sub-surface soil horizon.

Accordingly, one advantage of the present invention is that it provides wings with blades that can be embedded such as but not by way of limitation industrial diamonds, to cut through sub-surface impediments such as invasive species live roots, dead roots, and rocks.

Accordingly, one advantage of the present invention is that it provides wings that can be deployed at certain depths such as but not by way of limitation between two feet and two and a half feet and then retracted before ascension.

Accordingly, one advantage of the present invention is that it provides wings that can be disabled within an array when in proximity to a root zone.

Accordingly, one advantage of the present invention is that it provides wings that can be AI robotically, computer, PLC, and or sensor-controlled.

Accordingly, one advantage of the present invention is that it provides a value of changing the densities of soil to positively affect the yield. By adding a material that has substantially less bulk density a change in the porosity and the soil gravimetric profile occurs.

Accordingly, one advantage of the present invention is that it provides subsurface mixing of constituents and soil to create ideal soil bulk densities.

The following Table 1 depicts a general relationship of soil bulk density to root growth based on soil texture.

| Soil Texture | Ideal bulk densities for plant growth (g/cm3) | Bulk densities that restrict root growth (g/cm3) |
| --- | --- | --- |
| Sandy | <1.60 | >1.80 |
| Silty | <1.40 | >1.65 |
| Clayey | <1.10 | >1.47 |

Accordingly, one advantage of the present invention is that it provides compaction remediation by mixing materials sub-surface with wings to create aeration within the treated area.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which:

FIG. 4A illustrates an exemplary injection lateral perforated drill bit with electromagnetic actuator, guard, ejection spillway, guard spillway windows, un-deployed mixing wings, injection drill bit tip bayonet tip with fixed mixing blades, in accordance with at least one embodiment.

FIG. 4B illustrates an exemplary view of FIG. 4A of injection lateral perforated drill bit with an electromagnetic actuator, guard, ejection spillway, guard spillway windows, un-deployed mixing wings, injection drill bit bayonet tip with fixed mixing blades, in accordance with at least one embodiment.

FIG. 4C illustrates an exemplary view of FIG. 4A of injection lateral perforated drill bit with an electromagnetic actuator, guard, ejection spillway, guard spillway windows, partially deployed mixing wings, injection drill bit bayonet tip with fixed mixing blades, in accordance with at least one embodiment.

FIG. 5A illustrates an exemplary view of FIG. 4A of injection lateral perforated drill bit with an electromagnetic actuator, guard, ejection spillway, guard spillway windows, thirty-five percent deployed mixing wings, injection drill bit bayonet tip with fixed mixing blades, in accordance with at least one embodiment.

FIG. 5B illustrates an exemplary view of FIG. 4A of injection lateral perforated drill bit with an electromagnetic actuator, guard, ejection spillway, guard spillway windows, a number of deployed mixing wings, injection drill bit bayonet tip with fixed mixing blades, in accordance with at least one embodiment.

FIG. 5C illustrates an exemplary view of FIG. 4A of injection lateral perforated drill bit with electro-magnetic actuator, guard, ejection spillway, guard spillway windows, fully deployed mixing wings, injection drill bit bayonet tip with fixed mixing blades, in accordance with at least one embodiment.

FIG. 11A illustrates an exemplary communications platform of an injection drilling trailer with components seen in FIG. 11B and FIG. 11C, in accordance with at least one embodiment.

FIG. 11B illustrates an exemplary satellite communications dish, in accordance with at least one embodiment.

FIG. 11C illustrates an exemplary view of components within a circle of FIGS. 11A and 1105A, in accordance with at least one embodiment.

DETAILED DESCRIPTION

Figure 1A:
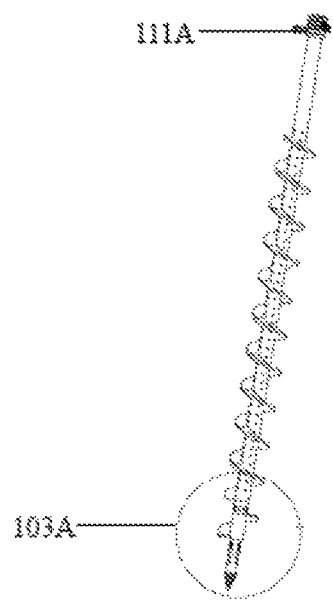
FIG. 1A illustrates an exemplary injection lateral perforated drill bit with an electro-magnetic actuator, guard, ejection spillway, guard spillway windows, un-deployed mixing wings, and injection drill bit tip, in accordance with at least one embodiment.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to, or readily developed from known manners, means, techniques and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

The invention teaches a sub-surface injection system for subsurface blending and horizon creation.

According to a first embodiment of the present invention, it enables wing fully extended mixing for the maximum area between injection drill bits.

According to a second embodiment of the present invention, it enables blending by ejection of material from the aperture and rising above the material, and then descending back to a depth of strata with wings extended full or partially during descent.

According to a third embodiment of the present apparatus, it enables blending by ejection of material from the aperture and descending below the material, and then ascending back to the depth of strata with wings extended full or partially during ascension.

According to a fourth embodiment of the present invention, it enables partially extended wings to control the sub-surface area being treated.

According to a fifth embodiment of the present invention, it retracts wings when live material is injected, by way of example but is not limitation earthworms.

According to a sixth embodiment of the present invention, it enables in some cases not fully deploying wings to be less destructive of injectable live organisms.

According to a seventh embodiment of the present invention, it enables the mixing of organic matter with other constituents for soil nutrient efficacy.

According to an eighth embodiment of the present invention, it enables deployment and retraction of wings at desired depths, and applying AI robotically, computer, plc, and or sensor signals to command the dispensing mechanism to reduce or increase the volumes of one or more Constituents to be mixed and or blended.

According to the ninth embodiment of the present invention, it enables the wings to be partially deployed so the circumferential area is less to mitigate root damage.

According to a tenth embodiment of the present invention, it enables the prevention of smearing through the distribution of abrasive organic matter.

According to an eleventh embodiment of the present invention, it enables discrete root ball destruction of unwanted, invasive, or nuisance plants or trees, such as certain Juniper tree species.

According to a twelfth embodiment of the present invention, it enables the addition of Constituents with multiple injections by deployment and retraction of wings at desired depths and applying AI Robotically, Computer, PLC, and or Sensor signals to command the dispensing mechanism to increase the volumes of one or more Constituents to be mixed and or blended.

According to a thirteenth embodiment of the present invention, it facilitates wings that enable eco-colonization of living constituents such as but not by way of limitation microbial colonies and fungi by dispersal within an extended diameter of the core injection.

According to a fourteenth embodiment of the present invention, it includes a secondary deployable blade from a wing to enhance cutting or reaming through any impediment including but not by way of limitation clays and rock.

According to a fifteenth embodiment of the present invention, it exploits variable rotational speeds of wings through AI robotics, sensors, PLC, and/or computer signals.

According to a sixteenth embodiment of the present invention, it blends, stirs, entrains, and/or agitates constituents with soil at that sub-surface depth.

According to a seventeenth embodiment of the present invention, it provides a method of universal and uniform sub-surface distribution of constituents vertically and horizontally.

According to an eighteenth embodiment of the present invention, it is an exploitation of a singular or multiple fixed-wing(s) to mix or blend certain soils.

According to a nineteenth embodiment of the present invention, it integrates sensors such as but not the way of limitation Lidar technology through AI robotic, PLC, computer commands, and or signals.

According to a twentieth embodiment of the present invention, it increases the global inventory of arable land with appropriate porosity constituents prescriptive for its ternary type. Porosity modification is a function of the shape and size of solid Constituents such as but not by way of limitation, aggregates affecting the bulk mass density of the targeted horizon. Likewise living constituents such as but not by way of limitation, aneic earthworms can improve porosity by penetrating below Horizon A.

According to a twenty-first embodiment of the present invention, it enables via a sensor, artificial intelligence, Computer, and or PLC database of soil type porosity and tightness dynamically interpreting resistance to the hollow shaft injection drill bit to initiate wings deployment to mitigate obstacles.

Definitions

"Abrasives": means any Constituent capable of inhibiting smearing. By way of example but not limited to abrasives include walnut shells, pecan shells, and corn stover.

"Actuated": A device that causes a machine or other device to operate open or close and dispense a volume of material by way of example but not limited to a gate or valve opening or closing.

"Actuated Aperture Closure": a device that causes a machine or other device to operate and close an aperture or open an aperture.

"Actuated Wings": An extension to the diameter of the Shaft Injection Drilling Bit to enable a horizontal rectangular length of material or any polygonal shape that moves from a 90-degree position via actuation actuated by any mechanical means including an electromagnet.

"Actuated Wings Fully": An Actuated Wing whose angle becomes perpendicular to the Shaft Injection Drilling Bit.

"Actuated Wings Partial": An Actuated Wing whose angle becomes less than 90 degrees but less than a fully extended or perpendicular position to the Shaft Injection Drilling Bit.

"Amendment Material": can also mean Constituents and or when used herein means any substance known to render a productivity advantage or benefit to sub-optimal soils and/or which provides any remediation benefit to such soils; and includes any biochar, compost, bacterial humus, and soil nutrients, fertilizers and fungi, particularly mycorrhizal fungi and mycorrhizal spores.

"Antimicrobial": is an agent that kills micro-organisms or stops their growth. Antimicrobials can be grouped according to the microorganisms they act primarily against. For example, antibiotics are used against bacteria, and antifungals are used against fungi.

"Aperture": An aperture is a hole or an opening through which can dispense or allow constituents to flow or stop flowing.

"Arm Mount Pin": Pins that affix the wings to the structures within the Collar.

"Baits": Any agent that attracts a pest or an unwanted organism. By way of example and not meant to be limiting, Baits for insects are often food-based baits and are an effective and selective method of insect control. Typically, a bait consists of a base material called a carrier (often grain or animal protein) plus a toxicant (most often insecticides such as organophosphates, carbamates, or pyrethroids) and sometimes an additive (usually oil, sugar, or water) to increase attractiveness. The toxicant part of bait can also be biological rather than chemical. Examples of biological toxicants are *Bacillus thuringiensis* (Bt), parasitic nematodes, and fungi. Many baits are not highly attractive to the insect but instead function as an arrestant. Baits for rodents are generally cereal-based and made of grains such as oats, wheat, barley, corn, or a combination thereof. Formulations may also contain other ingredients such as adherents to bond the toxicant to the grain particles.

"Ball Screw": A high-efficiency feed screw with the ball making a rolling motion between the screw axis and the nut. Compared with a conventional sliding screw, this product has drive torque of one-third or less, making it most suitable for saving drive motor power.

"Blades": A wing whose edges have implants by way of example but not limitation industrial diamonds or sharpened metal for cutting.

"Bayonet Claw": Two Arc structures for loose soil drilling.

"Bayonet Mixing Wing": A fixed horizontal rectangular length of material or any polygonal shape that mixes material sub-surface.

"Carbon Brush": A small block of carbon used to convey current between the stationary and moving parts of an electromagnet, electric generator, motor, etc.

"Chemical": Means a compound or substance that has been purified or prepared, especially artificially for purposes of sub-surface amendment, by way of example but not a limitation; fertilizers, sorption materials like zeolites, fungicides, herbicides, and insecticides. A chemical can mean any basic substance which is used in or produced by a reaction involving changes to atoms or molecules by way of example but is not limited to any liquid, solid, or gas.

"Cloud Computing": is a model for enabling ubiquitous, convenient, on-demand network access to a shared pool of configurable computing resources (e.g., networks, servers, storage, applications, and services) that can be rapidly provisioned and released with minimal management effort or service provider interaction.

"Coil": A length of something wound or arranged in a spiral or sequence of rings.

"Collar": An extension of a Hollow Shaft Injection Drill Bit that can be solid, and may be known as an Injection Drill Bit Auger Extension. It may also be a protection device with or without perforations or windows. Collars may have teeth or burrs to push sub-surface material away from Windows and Apertures.

"Collar Guard": A protective layer of material to inhibit soil intrusion into the Hollow Shaft Injection Drilling Bit.

"Collar Perforations": May be in any shape or pattern by way of example but not limitation the shape of hexagons in the pattern of a honeycomb.

"Collar Window": A Collar with a Window opening.

"Colloids": are uniform mixtures that don't separate or settle out. While colloidal mixtures are generally considered to be homogeneous mixtures, they often display heterogeneous quality when viewed on the microscopic scale. There are two parts to every colloid mixture: the particles and the dispersing medium. The colloid particles are solids or liquids that are suspended in the medium. These particles are larger than molecules, distinguishing a colloid from a solution. However, the particles in a colloid are smaller than those found in a suspension. In smoke, for example, solid particles from combustion are suspended in a gas. Colloids include, Examples of colloids include by way of examples but are not limited to the following fog, smoke, and foam.

"Computer": An electronic device for storing and processing data, typically in binary form, according to instructions given to it in a variable program. May include by way of specificity an AI robot.

"Cone": A solid or hollow object, which tapers from a circular or approximate circular base to a point.

"Cone Shaped Spillway": A spillway in the shape of a cone whose apex is at the center of the Hollow Shaft injection Drilling Bit.

"Connection Shaft": A cylindrical or polygonal shape that can add and connect functions to the Injection Drill Bit.

"Constituent": Any soil amendment material by way of example but not limitation abrasives, aggregate, amendments, minerals, lime, calcium, calcium carbonate, abrasives, antimicrobials, baits, bio-char, biologicals, bio-mass, carbon including activated, chemicals, colloids, compost, eco colonies, pre cursors to the eco colony, living organisms, inoculants, gas or any other material that can be injected sub surface to change the soil composition and or temperature. Constituents can mean chemical pesticides or natural biologicals for unwanted pests. Solid constituents can be any polygonal shape, such as fines, granules, pellets, briquettes, blocks, or larger fragments that can fit inside and be ejected from a hollow shaft drill bit. Colloids regardless of phase state are considered as constituents. Constituents can contain doses of other constituents. Constituents also include Sorption or Sorbents materials.

"Copper Bands": The windings are flat copper strips to withstand the Lorentz force of the magnetic field. Electricity in the wire gets into the ring to make it into a magnet. A copper band includes any conductive material or alloy.

"Coupling, Gear Box Couplings, Gear Box Disc Coupling": Transmit torque from a driving to a driven bolt or shaft tangentially on a common bolt circle. Gear Box couplings are designed to transmit torque between two shafts that are not collinear. They typically consist of two flexible joints-one fixed to each shaft-which are connected by a spindle, or third shaft. A flange within the drawings below or at the top of a gearbox is Disc Couplings.

"Cylinder Male Mate": to the underside of the wing acting as a stop.

"Damping": This can refer to the equipment platform, where the substrate is materials such as granite or plastics that have tensile strength for mounting but have properties to damp vibration and or torque.

"Density": Bulk density, also called apparent density or volumetric density, is a property of powders, granules, and other "divided" solids, especially used in reference to mineral components (soil, gravel), chemical substances.

"Drill Bit Mounting Cavity": and or motorized wing deployment alternate method power unit (hole at the bottom) which can also mate with next injection drill bit assembly component.

"Drill Bit" or "Drill Bit Tip": Any device capable of making a subsurface hole when connected to a power source with perforation holes or apertures, which may be any polygon with equal or unequal side lengths, and is manufactured from alloys, steel, titanium, manganese or other materials. The drill bit may contain industrial diamonds for sub-surface injection cavity creation.

"Eco Colony": Any subsurface space that is created by the injection of preferred constituents as established or precursor natural habitat for any specific desirable living organism.

"Eco Colony Pre Cursors": Injected subsurface Eco Colony habitat that is not populated by inhabitant colony.

"Electromagnet Coil": An electromagnetic coil is an electrical conductor such as a wire in the shape of a coil, spiral, or helix. It can be used to implement contactless position or proximity sensing. The field produced by the current in one coil induces a corresponding current in an adjacent coil, as in a power transformer. If, however, the second coil is mobile, the induced current is reduced as the distance increases.

"Electromagnetic Spring Aperture": An actuated opening.

"Electro-Magnetic Spring Injection Drill Bit Aperture Cap": An actuated opening at the end of a Hollow Shaft Injection Drilling Bit or Auger or Tube.

"Electromagnet Window Aperture": An actuated opening usually vertical.

"Electromagnet Wires": Negative and or Positive Wire.

"Encoders": Encoders are used in machinery for motion feedback and motion control. Encoders are found in machinery in all industries. Encoders (or binary encoders) are the combinational circuits that are used to change the applied input signal into a coded format at the output. These digital circuits come under the category of a medium-scale integrated circuits. In our case, they assist in-depth assessment and or achievement. Encoders through communication with PLC, Computer, or AI robotics and other interactive devices can trigger drilling platform ascent or descent or deployment and or retraction stacking of plunger. Depth achievement can trigger dispensing, plunger instructions, reamer wings, continued drilling or ascent, and then descent or repetition of these actions.

"Extension Spring": An aperture spring that is composed of multiple springs to deploy the spring cap panel segment of an aperture closure.

"Fastener Ring": A ring feature as part of the Plunger Panel that holds Plunger Panels in shut-stacked, deployed or in the right position, and attached to the motor shaft.

"Flange": Is a rim. Where a flange appears in a drawing associated with a hollow shaft injection drill bit can also mean a Gear Box Coupling and or Gear Box Disc Coupling. A flange can also be a chord and part of the internal diameter of the Tube.

"Gear Box": The gearbox is a mechanical device used to increase the output torque or to change the speed (RPM) of a motor. The shaft of the motor is connected to one end of the gearbox and through the internal configuration of gears of a gearbox, provides a given output torque and speed determined by the gear ratio.

"GPS" "Global Positioning Satellite": An accurate worldwide navigational and surveying facility based on the reception of signals from an array of orbiting satellites.

"Hollow Shaft": Any injection auger and or drill bit space between the walls, space may be cylindrical or any polygonal shape.

"Hollow Shaft of Injection Drilling Auger": A cylinder, threaded cylinder, or corkscrew and has multiple parts: collar, bottom aperture, window aperture, spillway, perforations, wings, screw, spurs, cutting edges, twist, shank, and in some cases a tang.

"Hollow Shaft Injection Drilling Bit": Auger bits have adjustable blades with cutting edges and spurs that can be extended radially to cut large holes.

"Hollow Shaft Injection Drill Bit Screw Rib": Any rib on the side of the shaft of an auger drill bit or any drill bit.

"Injection Drilling Bit": Either a bayonet, flat, impregnated head, screw, auger, fish tail, or any shape that can penetrate a sub-surface environment.

"Injection Drill Bit Auger Extension": A connection segment for devices used in sub-surface operations. Some examples are Windows, Apertures, and Wings.

"Injection Drill Bit": Any hollow shaft device of any polygonal width or diameter that is capable of penetration of ice, soil, rock, and or mineral.

"injection Drill Bit Screw": A tapered shape drilling bit or cylindrical shape with threads like a screw, with or without perforations.

"Inoculants": A constituent (a virus or toxin or immune serum) that is introduced into the sub-surface of the soil to produce or increase immunity to an undesirable living organism.

"insulation": A material in which electric current does not flow freely.

"Lead Screw": A threaded rod that drives the platform tool carriage in a drill or drilling array when subsurface drilling. Lead Screw can also be a Ball Screw, Worm Screw or Worm Gear.

"Limit Switch": a switch preventing the travel of an object in a mechanism past some predetermined point, mechanically operated by the motion of the object itself. Limit Switches are found in machinery in all industries. In this application assist in communicating depth achievement for ascent or descent communicating to PLC, Computer, or AI robotics and other interactive devices. Depth achievement can trigger dispensing, plunger instructions, reamer wings, continued drilling or ascent, and then descent or repetition of these actions. A Limit Switch can refer to a plurality.

"Living Organisms": An individual form of life, by way of example but not limitation a bacterium, protist, fungus, plant, or animal, composed of a single cell or a complex of cells in which organelles or organs work together to carry out the various processes of life, including in some circumstances virus.

"Magnetic Metals": Include ferromagnetic metals by way of example but not limit iron, nickel, cobalt, gadolinium, dysprosium, and alloys by way of example but not limited to steel that also contains specific ferromagnetic metals such as iron or nickel.

"Minerals": A solid chemical compound with fairly well-defined chemical composition and a specific crystal structure that occurs naturally in pure form.

"Negative Wire": If you have a wire where both sides are the same color, which is typically copper, the strand that has a grooved texture is the negative wire.

"Organic Matter": Organic matter, organic material, or natural organic matter refers to the large source of carbon-based compounds found within natural and engineered, terrestrial, and aquatic environments. It is matter composed of organic compounds that have come from the feces and remains of organisms such as plants and animals. In soils, dead matter makes up roughly 85% of the organic matter. Organic matter includes dead matter, living microbes, and living parts of plants (e.g., roots). Organic Matter includes the four basic types pure substance that cannot be broken down into other types of substances; lipid organic compound such as fat or oil; matter anything that takes up space and has mass; monosaccharide simple sugar such as glucose that is a building block of carbohydrates; nucleic acid organic compound such as DNA or RNA; nucleotide.

"Open Window": A window that is not closed by actuation of an aperture or without cover and or a window with a perforation pattern.

"Open Window Aperture": Is a polygon shape window that opens and closes via actuation.

"Perforation": Any polygonal shape that is a hole within a shaft, collar, guard, or tube. Perforations enable dispensing, injection, and ejection of constituents both vertically and laterally.

"Platform": A ledge or shelf with damping.

"PLC": A programmable logic controller (PLC) is a small, modular solid-state computer with customized instructions for performing a particular task. PLCs, which are used in industrial control systems (ICS) for a wide variety of industries, have largely replaced mechanical relays, drum sequencers, and cam timers. PLCs are used for repeatable processes and have no mechanical parts and they can gather information from sensors. PLC can also mean a computer, and or remote Cloud computer.

"Polygon": a plane figure with at least three straight sides and angles, and typically five or more.

"Porosity Soil or Soil Porosity": refers to the quantity of pores, or open space, between soil particles. Pore spaces may be formed due to the movement of roots, worms, and insects: expanding gases trapped within these spaces by groundwater; and/or the dissolution of the soil's parent material. Soil texture can also affect soil porosity. There are three main soil textures: sand, silt, and clay. Sand particles have diameters between 0.05 and 2.0 mm (visible to the naked eye) and are gritty to the touch. Silt is smooth and slippery to the touch when wet, and individual particles are between 0.002 and 0.05 mm in size. Clay is less than 0.002 mm in size and is sticky when wet. The differences in the size and shape of sand, silt, and clay influence the way the soil particles fit together, and thus their porosity.

"Positive Wire": The positive wire, also commonly called the hot wire, is usually black. It is the source of electricity.

"Process Methodology Diagram": An illustrative process step by step to show the function of an embodiment.

"Protrusion Jacket": Socket and/or cavity with walls that hold connections for wires, insulation to carbon brushes.

"Rib of Drill Bit": Any rib on the side of the shaft of an auger drill bit or any drill bit.

"Revolutions Per Minute or RPM": The speed of a motor.

"Root Zone": The root zone of plants in the area of soil and oxygen surrounding the roots of a plant. Roots are the starting point of a plant's vascular system. Water and nutrients are pulled up from the oxygenated soil around the roots, called the root zone, and pumped into all the aerial parts of the plant. Perennials and Trees also have root zones.

"Rhizome": The rhizome is a horizontal underground plant stem that sends out roots and shoots from nodes. In some plants, a rhizome is the only stem. In others, it is the main stem. Plants use rhizomes to store food and for vegetative propagation.

"Router": is a network hardware device equipped with a cellular hot spot that allows making communication between the internet and all devices which are linked to the internet in your house and office. The router has responsible to receives, analyze, and forwarding all data packets from the modem and transferring it to the destination point.

"Satellite Dish": a bowl-shaped antenna with which signals are transmitted to or received from a communications satellite.

"Shaft of Injection Drilling Auger": Connection section to other components of Drilling Auger or Drilling Auger Bit.

"Slip Ring or Slip Ring Bore Hole": a ring in a dynamo or electric motor which is attached to and rotates with the shaft, passing an electric current to a circuit via a fixed brush pressing against it. A Slip Ring with a hollow shaft creates a borehole for an injection drill bit shaft.

"Socket Attachment For Injection Drill Bit": Also known as a Collar.

"Sorption or Sorbents" Are Constituents capable of adsorbing/absorbing one or more constituents in gas, fluid, liquid, or a mixture thereof. Examples include activated carbon, atomic particles, bio-char, carbon materials, activated carbon, carbon nanotubes, catalysis, graphene, metal hydrides, nanoparticles, nano-structured materials, polymeric organic frameworks, silica, silica gel, clay, zeolites, other adsorbents/absorbents, or combination thereof. Useful adsorbents/absorbents, such as carbon materials, have high surface areas and a high density of pores with optimal diameter. Sorption or Sorbents can be different types of activated charcoal and zeolites. Sorption or Sorbents may also be combinations that vary by type(s) of metal ions and/or organic material(s) used, and may be made in molecular clusters or molecular chains to obtain the desired quality, i.e. type of adsorption/absorption, and volume capacity in terms of the desired porosity. Examples of Sorption or Sorbents also include constituents such as but are not limited to Bio-Char and Zeolites.

"Spillway": A polygonal shape often likes a cone or other shape with an incline and or peak.

"Spring": An elastic or metal body or device that recovers its original shape when released after being distorted.

"Spring Aperture Cap Panel Segment": A composite of springs and aperture segments.

"Spring Arm Mounting Disk": A flat cylindrical shape for mounting it can also be a flange.

"Subsoil": is the layer of soil below the topsoil. The layer of soil closest to our feet is topsoil. Geologists refer to it as the "A" horizon, whereas subsoil is the "B" horizon. Topsoil is much more fertile than subsoil because it contains more organic matter, thus giving it a darker color. As per the soil profile, this is a kind of soil that lies below the surface soil but above the bedrocks. It is also called undersoil or B Horizon soil. It lies between C Horizon and E Horizon. The B Horizon predominantly consists of leached materials as well as minerals such as iron and aluminum compounds. Living Organisms aid Horizon A fertility but these organisms because of Porosity spend very little time below Horizon A.

"Suspended": Suspended is defined as suspension which is a heterogeneous mixture in which the solute particles do not dissolve but get suspended throughout the bulk of the medium. Emulsions are a type of suspension, where two immiscible liquids are mixed together. Any constituents that are liquid or particle held in suspension.

"Suspensions": An emulsion is a suspension of two liquids that usually do not mix together. These liquids that do not mix are said to be immiscible. An example would be oil and water.

"Window": A polygonal shape such as a rectangle that enables the flow of constituents from the Shaft of Injection Drilling Auger subsurface.

"Window Vertical Aperture": A side shaft window rather than a bottom window of the shaft of the injection drilling auger.

"Wings": An extension to the diameter of the Shaft Injection Drilling Bit to enable a horizontal rectangular length of any solid, slits, lattices, or perforated material in any polygonal shape, that can include sharp cutting edges, and or abrasive coatings such as industrial diamonds that move anywhere from or to a 90-degree position via actuation by any mechanical means including but not by way of limitation an electromagnet.

"Wing Mount Arm": A mounting for the Wing to the Injection Drilling Shaft.

"Wing Mount Pin": A pin that enables the actuation motion of the Wing.

"Worm Screw and Worm Gear": Used to transmit motion and power when a high-ratio speed reduction is required. Worm Screws and Worm Gears accommodate a wide range of speed ratios.

"Zeolites": Any of various hydrous silicates that are analogous in composition to the feldspars, occur as secondary minerals in cavities of lavas, and can act as ion-exchangers. Any of various natural or synthesized silicates of similar structure are used especially in water softening and as adsorbents and catalysts. Zeolites offer the capability of salinity and boron remediation. Clinoptilolite (a naturally occurring zeolite) is used as a soil treatment in agriculture. It is a source of potassium that is released slowly. They can adsorb effluent and ammonia, and subsequently be used as soil nutrients.

FIG. 1A illustrates an exemplary injection lateral perforated drill bit with an electro-magnetic actuator, guard, ejection spillway, guard spillway windows, un-deployed mixing wings, and injection drill bit tip, in accordance with at least one embodiment. FIG. 1A depicts call out of close-up of FIG. 1B of 103A, and an electromagnet 111A that actuates FIG. 1B calls out 105B.

Figure 1B:
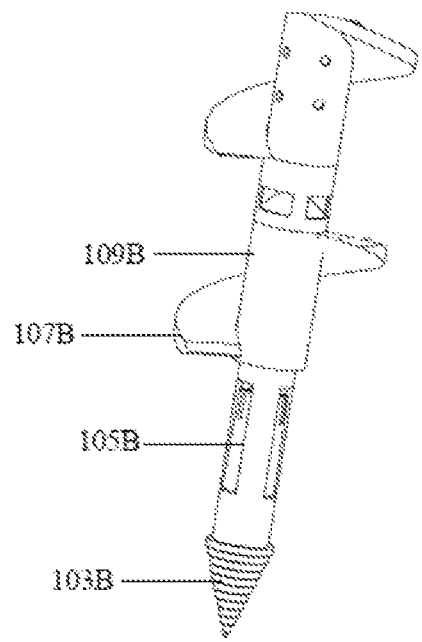
FIG. 1B illustrates an exemplary view of FIG. 1A of injection lateral perforated drill bit with an electromagnetic actuator, guard, ejection spillway, guard spillway windows, un-deployed mixing wings, injection drill bit tip, in accordance with at least one embodiment.

FIG. 1B illustrates an exemplary view of FIG. 1A of injection lateral perforated drill bit with an electromagnetic actuator, guard, ejection spillway, guard spillway windows, un-deployed mixing wings, injection drill bit tip, in accordance with at least one embodiment. FIG. 1B depicts a tip of injection drilling auger 103B, non-actuated mixing wings 105B, rib of injection drilling auger 107B, and a connection shaft of injection drilling auger 109B.

Figure 2A:
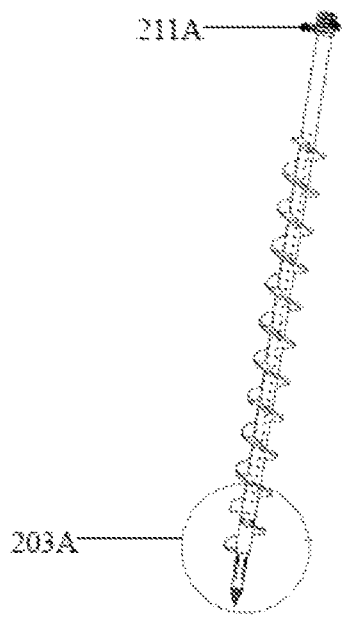
FIG. 2A illustrates an exemplary injection lateral perforated drill bit with an electromagnetic actuator, guard, ejection spillway, guard spillway windows, un-deployed mixing wings, and injection drill bit tip, in accordance with at least one embodiment.

FIG. 2A illustrates an exemplary injection lateral perforated drill bit with an electromagnetic actuator, guard, ejection spillway, guard spillway windows, un-deployed mixing wings, and injection drill bit tip, in accordance with at least one embodiment. FIG. 2A depicts a call-out of a close-up view of FIG. 1B of 203A, and electromagnet 211A that actuates FIG. 2B call out 205B.

Figure 2B:
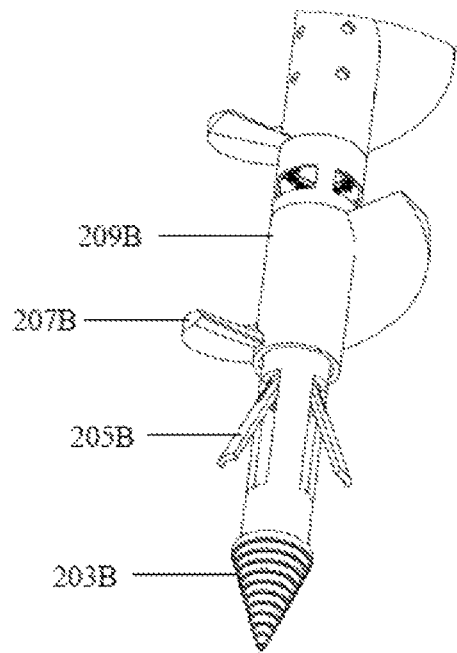
FIG. 2B illustrates an exemplary view of FIG. 2A of injection lateral perforated drill bit with an electromagnetic actuator, guard, ejection spillway, guard spillway windows, partially deployed mixing wings, and injection drill bit tip, in accordance with at least one embodiment.

FIG. 2B illustrates an exemplary view of FIG. 2A of injection lateral perforated drill bit with an electromagnetic actuator, guard, ejection spillway, guard spillway windows, partially deployed mixing wings, and injection drill bit tip, in accordance with at least one embodiment. FIG. 2B depicts a tip of injection drilling auger 203B, a partially actuated mixing wings 205B, a rib of injection drilling auger 207B, and a connection shaft of injection drilling auger 209B.

Figure 3A:
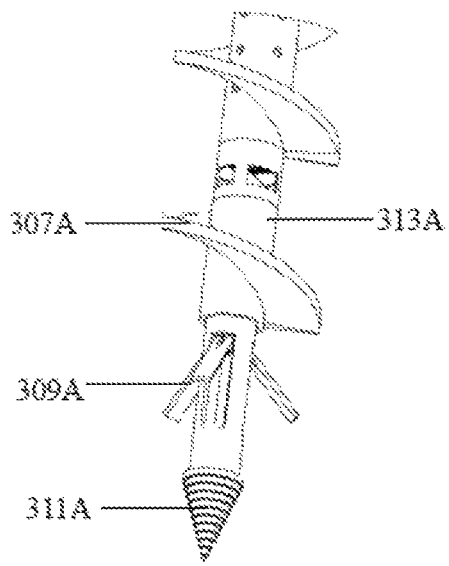
FIG. 3A illustrates an exemplary view of FIG. 2A of injection lateral perforated drill bit with an electromagnetic actuator, guard, ejection spillway, guard spillway windows, fifty percent deployed mixing wings, and injection drill bit tip, in accordance with at least one embodiment.

FIG. 3A illustrates an exemplary view of FIG. 2A of injection lateral perforated drill bit with an electromagnetic actuator, guard, ejection spillway, guard spillway windows, fifty percent deployed mixing wings, and injection drill bit tip, in accordance with at least one embodiment. FIG. 3A depicts a rib of injection drilling auger 307A, a partially actuated mixing wings 309A, a tip of injection drilling auger 311A, and a connection shaft of injection drilling auger 313A.

Figure 3B:
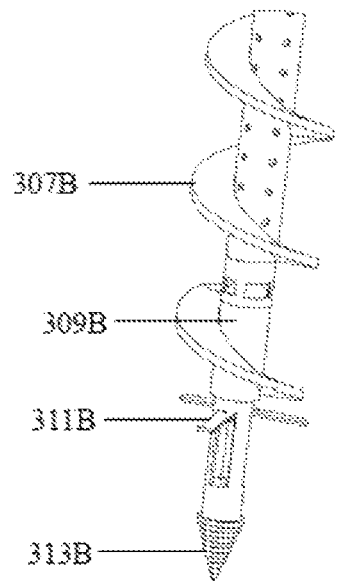
FIG. 3B illustrates an exemplary view of FIG. 2A of injection lateral perforated drill bit with an electromagnetic actuator, guard, ejection spillway, guard spillway windows, fifty percent deployed mixing wings, and injection drill bit tip, in accordance with at least one embodiment.

FIG. 3B illustrates an exemplary view of FIG. 2A of injection lateral perforated drill bit with an electromagnetic actuator, guard, ejection spillway, guard spillway windows, fifty percent deployed mixing wings, and injection drill bit tip, in accordance with at least one embodiment. FIG. 38 depicts a rib of injection drilling auger 307B, a connection shaft of injection drilling auger 309B, a fully actuated mixing wings 311B, and a tip of injection drilling auger 313B.

FIG. 4A illustrates an exemplary injection lateral perforated drill bit with electromagnetic actuator, guard, ejection spillway, guard spillway windows, un-deployed mixing wings, injection drill bit tip bayonet tip with fixed mixing blades, in accordance with at least one embodiment. FIG. 4A depicts an electromagnet 403A that actuates FIG. 1B call-out 105B, call out 405A of close up of FIG. 1B and FIG. 4C.

FIG. 4B illustrates an exemplary view of FIG. 4A of injection lateral perforated drill bit with an electromagnetic actuator, guard, ejection spillway, guard spillway windows, un-deployed mixing wings, injection drill bit bayonet tip with fixed mixing blades, in accordance with at least one embodiment. FIG. 4B depicts a connection shaft of injection drilling auger 409B, non-actuated mixing wings 411B, bayonet claw 413B, bayonet mixing wing 415B, and bayonet mixing wing 419B.

FIG. 4C illustrates an exemplary view of FIG. 4A of injection lateral perforated drill bit with an electromagnetic actuator, guard, ejection spillway, guard spillway windows, partially deployed mixing wings, injection drill bit bayonet tip with fixed mixing blades, in accordance with at least one embodiment. FIG. 4C depicts a rib of injection drilling auger 405C, connection shaft of injection drilling auger 409C, a partially actuated mixing wings 411C, bayonet 413C, a bayonet mixing wing 415C, a bayonet mixing wing 417C, and a partially actuated mixing wings 419C.

FIG. 5A illustrates an exemplary view of FIG. 4A of injection lateral perforated drill bit with an electromagnetic actuator, guard, ejection spillway, guard spillway windows, thirty-five percent deployed mixing wings, injection drill bit bayonet tip with fixed mixing blades, in accordance with at least one embodiment. FIG. 5A depicts a perforated shaft of injection drilling auger 503A, a non-perforated portion of the hollow shaft of injection drilling auger 505A, a spring-loaded cap of hollow perforated shaft injection drilling auger 507A, a rib of injection drilling auger 509A, a partially actuated mixing wings 511A, a bayonet mixing wing 513A, a bayonet 515A, a bayonet mixing wing 517A, a partially actuated mixing wings 519A, and a collar guard with rectangular windows 521A.

FIG. 5B illustrates an exemplary view of FIG. 4A of injection lateral perforated drill bit with an electromagnetic actuator, guard, ejection spillway, guard spillway windows, a number of deployed mixing wings, injection drill bit bayonet tip with fixed mixing blades, in accordance with at least one embodiment. FIG. 5B depicts a non-perforated hollow shaft of injection drilling auger 503B, a top of collar guard 505B, a spring-loaded cap of hollow perforated shaft injection drilling auger 507B, a rib of injection drilling auger 509B, a partially actuated mixing wings 511B, a partially actuated mixing wings 513B, a bayonet mixing wing 515B, bayonet 517B, bayonet mixing wing 519B, a partially actuated mixing wings 521B, and a collar guard with rectangular windows 523B.

FIG. 5C illustrates an exemplary view of FIG. 4A of injection lateral perforated drill bit with electro-magnetic actuator, guard, ejection spillway, guard spillway windows, fully deployed mixing wings, injection drill bit bayonet tip with fixed mixing blades, in accordance with at least one embodiment. FIG. 5C depicts a perforated shaft of injection drilling auger 503C, a non-perforated shaft area of injection drilling auger 505C, a rib of injection drilling auger 507C, a spring-loaded cap of hollow perforated shaft injection drilling auger 509C, a fully actuated mixing wings 511C, a fully actuated mixing wings 513C, a bayonet mixing wing 515C, bayonet 517C, fully actuated mixing wings 519C, a bayonet mixing wing 521C, spillway 523C, and a guard with rectangular windows 525C.

Figure 6A:
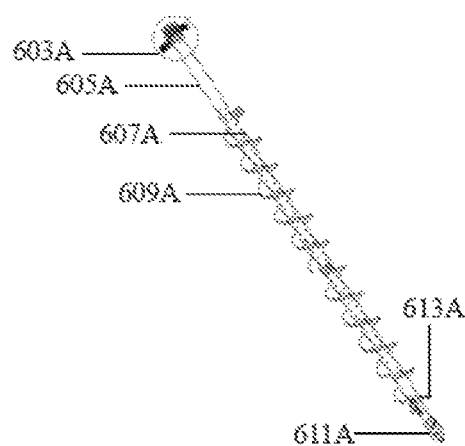
FIG. 6A illustrates an exemplary view of an injection drill bit with an electromagnetically actuated bottom enclosure, in accordance with at least one embodiment.

FIG. 6A illustrates an exemplary view of an injection drill bit with an electromagnetically actuated bottom enclosure, in accordance with at least one embodiment. FIG. 6A depicts a call-out 603A for a close-up of FIG. 6B, a shaft 605A of hollow injection drilling auger, a perforation of hollow injection drilling auger 607A, rib of hollow injection drilling auger 609A, bayonet 611A, and a deployed mixing wing 613A.

Figure 6B:
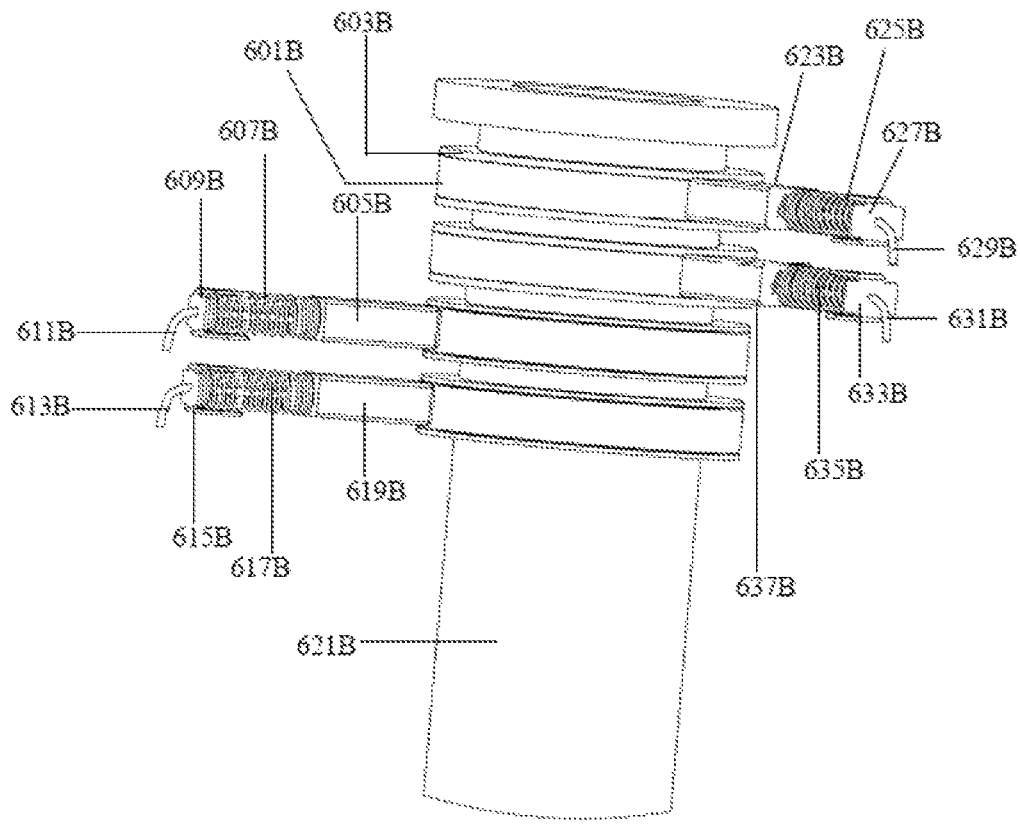
FIG. 6B illustrates an exemplary electromagnetic actuated feature with detailed components as seen in FIG. 6A, in accordance with at least one embodiment.

FIG. 6B illustrates an exemplary electromagnetic actuated feature with detailed components as seen in FIG. 6A, in accordance with at least one embodiment. FIG. 6B depicts a copper band 601B, insulation 603B, a carbon brush 605B, spring 607B, protective enclosure 609B, a positive wire 611B, a negative wire 613B, protective enclosure 615B, spring 617B, carbon brush 619B, shaft of injection drilling auger 621B, carbon brush 623B, spring 625B, protective enclosure 627B, positive wire 629B, negative wire 631B, protective enclosure 633B, spring 635B, and carbon brush 637B.

Figure 7A:
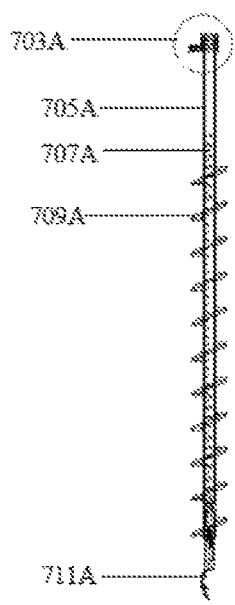
FIG. 7A illustrates an exemplary injection bayonet drill bit with an electromagnetically actuated bottom enclosure, in accordance with at least one embodiment.

FIG. 7A illustrates an exemplary injection bayonet drill bit with an electromagnetically actuated bottom enclosure, in accordance with at least one embodiment. FIG. 7A depicts a call-out 703A for a close-up of FIG. 7B, a shaft 705A of hollow injection drilling auger, a perforation of hollow injection drilling auger 707A, rib of hollow injection drilling auger 709A, and bayonet 711A.

Figure 7B:
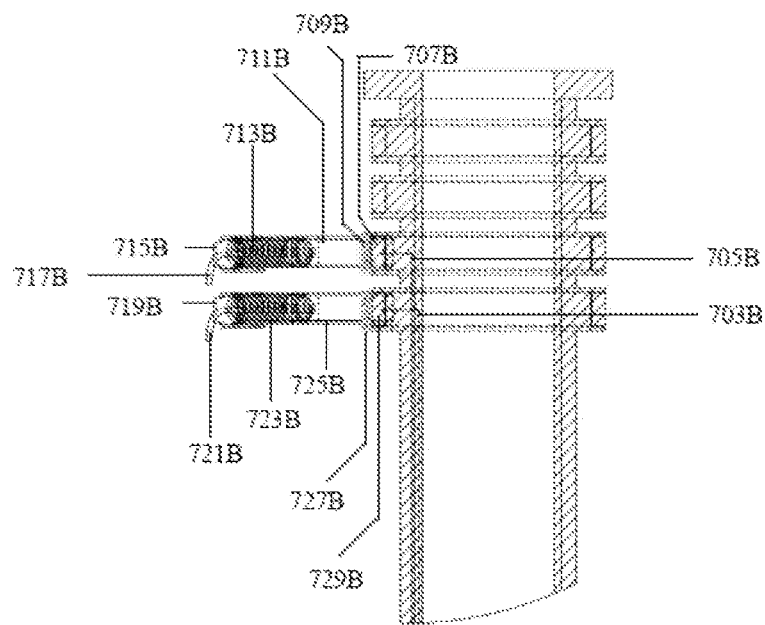
FIG. 7B illustrates an exemplary cross-section of electromagnetic actuated features with details including wiring and insulation components as seen in FIG. 7A, in accordance with at least one embodiment.

FIG. 7B illustrates an exemplary cross-section of electromagnetic actuated features with details including wiring and insulation components as seen in FIG. 7A, in accordance with at least one embodiment. FIG. 7B depicts a negative wire 703B, a positive wire 705B, insulation 707B, copper band 709B, carbon brush 711B, spring 713B, protective enclosure 715B, positive wire 717B, protective enclosure 719B, negative wire 721B, spring 723B, carbon brush 725B, copper band 727B, and insulation 729B.

Figure 8A:
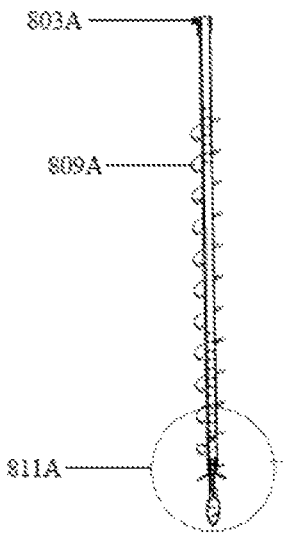
FIG. 8A illustrates an exemplary call out for a view of FIG. 8B, in accordance with at least one embodiment.
Figure 8B:
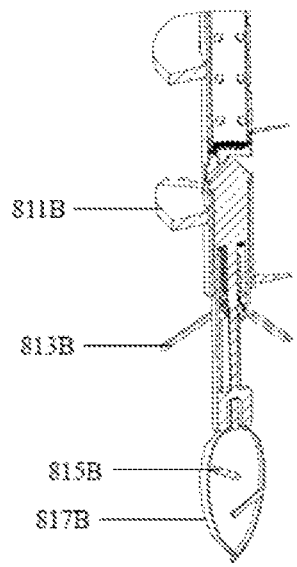
FIG. 8B illustrates an exemplary view of a bayonet injection drilling auger tip and fixed wings, in accordance with at least one embodiment.

FIG. 8A illustrates an exemplary call out for a view of FIG. 8B, in accordance with at least one embodiment. FIG. 8A depicts an electromagnet 803A, rib of hollow injection drilling auger 809A, and call out 811A for close up of a cross-section of FIG. 8B.

FIG. 8B illustrates an exemplary view of a bayonet injection drilling auger tip and fixed wings, in accordance with at least one embodiment. FIG. 8B depicts a rib of hollow injection drilling auger 811B, deployed actuated mixing wing 813B, mixing blade 815B, and bayonet 817B.

Figure 9A:
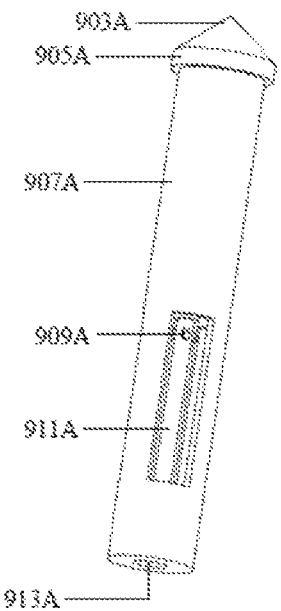
FIG. 9A illustrates an exemplary non-actuated mixing wing assembly, in accordance with at least one embodiment.
Figure 9B:
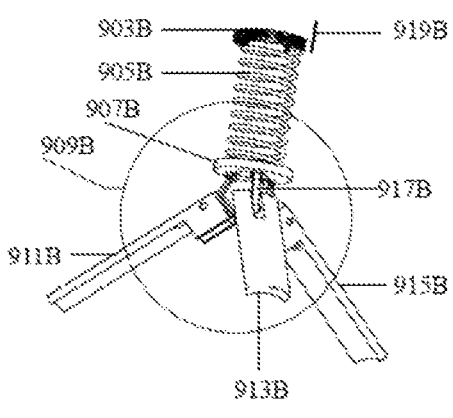
FIG. 9B illustrates an exemplary view of a partially actuated mixing wing assembly, in accordance with at least one embodiment.

FIG. 9A illustrates an exemplary non-actuated mixing wing assembly, in accordance with at least one embodiment. FIG. 9A depicts a cone shape cap for spillway 903A, collar 905A, enclosure 907A, arm mount pin 909A, wing non-actuated 911A, and socket attachment for injection drill bit 913A, FIG. 9B illustrates an exemplary view of a partially actuated mixing wing assembly, in accordance with at least one embodiment. FIG. 9B depicts an electromagnet coil 903B, spring 905B, spring arm mounting disk 907B, and an assembly close-up of FIG. 9C 9091, wing partially actuated 911B, wing tip with blade edge partially actuated 913B, a wing with blade side edge partially actuated 915B, wing mount arm 917B, and wires 919B.

Figure 9C:
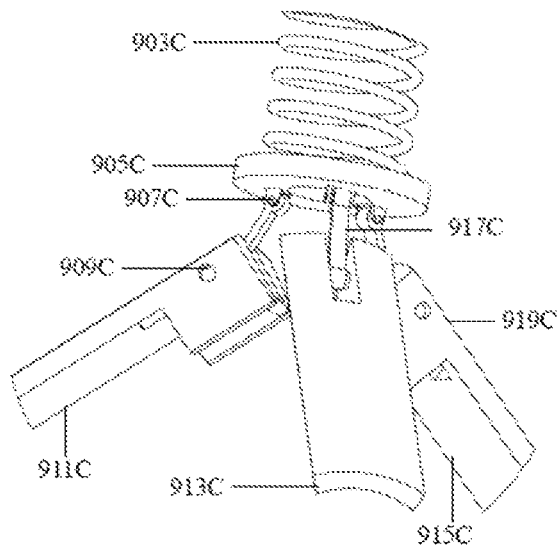
FIG. 9C illustrates an exemplary enhanced view of FIG. 9B showing partially actuated mixing wing, in accordance with at least one embodiment.

FIG. 9C illustrates an exemplary enhanced view of FIG. 9B showing partially actuated mixing wing, in accordance with at least one embodiment. FIG. 9C depicts a spring 903C, spring arm mounting disk 905C, arm mount pin 907C, wing mount pin 909C, wing partially actuated 911C, wing without blade tip partially actuated 913C, under side of wing partially actuated 915C, wing mount arm partially actuated 917C, and side of wing partially actuated 919C.

Figure 10A:
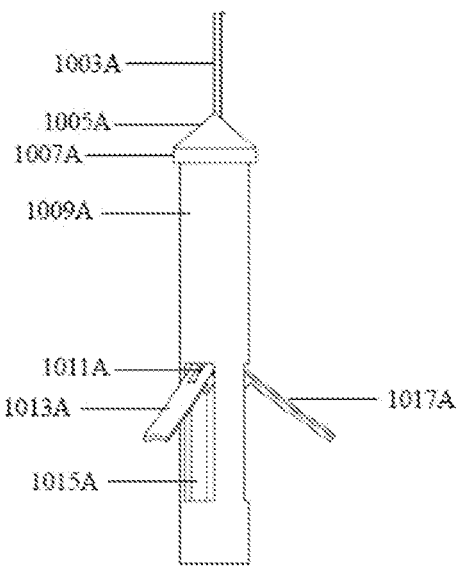
FIG. 10A illustrates an exemplary spillway and deployed mixing wing assembly, in accordance with at least one embodiment.

FIG. 10A illustrates an exemplary spillway and deployed mixing wing assembly, in accordance with at least one embodiment. FIG. 10A depicts positive-negative wires 1003A, cap in the shape of a cone 1005A, cap rim 1007A, shaft of device 1009A, wing blade mount arm 1011A, wing blade partially extended 1013A, wing blade housing cavity 1015A, and wing blade partially extended 1017A.

Figure 10B:
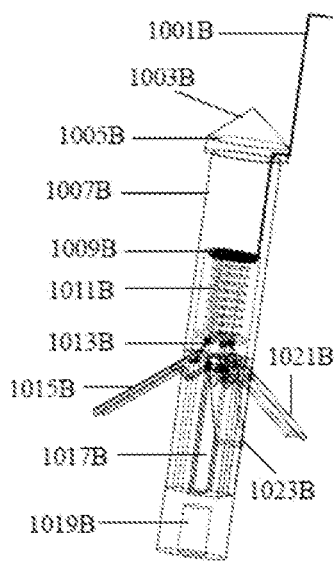
FIG. 10B illustrates an exemplary deployed mixing wing component feature with a transparent casing to reveal components and wiring, in accordance with at least one embodiment.

FIG. 10B illustrates an exemplary deployed mixing wing component feature with a transparent casing to reveal components and wiring, in accordance with at least one embodiment. FIG. 10B depicts positive-negative wires 1001B, cap in the shape of a cone 1003B, cap rim 1005B, a shaft of device 1007B, coil 1009B, spring 1011B, wing blade mount arm 1013B, cylinder male mate 1017B to the underside of FIG. 10B 1015B acting as a stop, drill bit mounting cavity 1019B and/or motorized wing deployment alternate method power unit, wing blade 1021B partially extended, wing blade 1023B partially extended.

Figure 10C:
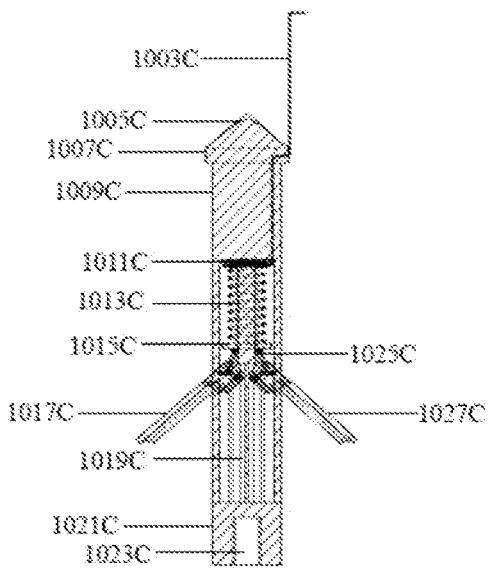
FIG. 10C illustrates an exemplary view of a cross-section of FIG. 9A showing spring, platform, wiring, coil, hinges, deployed mixing blades, and interface to bottom injection drill bit affixed head, in accordance with at least one embodiment.

FIG. 10C illustrates an exemplary view of a cross-section of FIG. 9A showing spring, platform, wiring, coil, hinges, deployed mixing blades, and interface to bottom injection drill bit affixed head, in accordance with at least one embodiment. FIG. 10C depicts positive negative wires 1003C, cap in the shape of a cone 1005C, cap rim 1007C, shaft of device 1009C, coil 1011C, spring 1013C, platform 1015C, wing blade partially extended 1017C, cylinder male mate 1019C: to the underside of FIG. 10C 1017C acting as a stop, shaft of device 1021C, drill bit mounting cavity 1023C and/or motorized wing deployment alternate method power unit, wing blade arm mount pin 1025C, and wing blade partially extended 1027C.

FIG. 11A illustrates an exemplary communications platform of an injection drilling trailer with components seen in FIG. 11B and FIG. 11C, in accordance with at least one embodiment. FIG. 11A depicts a satellite communications dish 1103A, and communications platform 1105A containing components seen in FIG. 11C.

FIG. 11B illustrates an exemplary satellite communications dish, in accordance with at least one embodiment. FIG. 11B depicts a satellite communications dish 1103B.

FIG. 11C illustrates an exemplary view of components within a circle of FIG. 11A and 1105A, in accordance with at least one embodiment. FIG. 11C depicts a fuel cell 1103C, PLC 1105C, AI robot 1107C, router 1109C, computer 1111C, and GPS 1113C.

Figure 12:
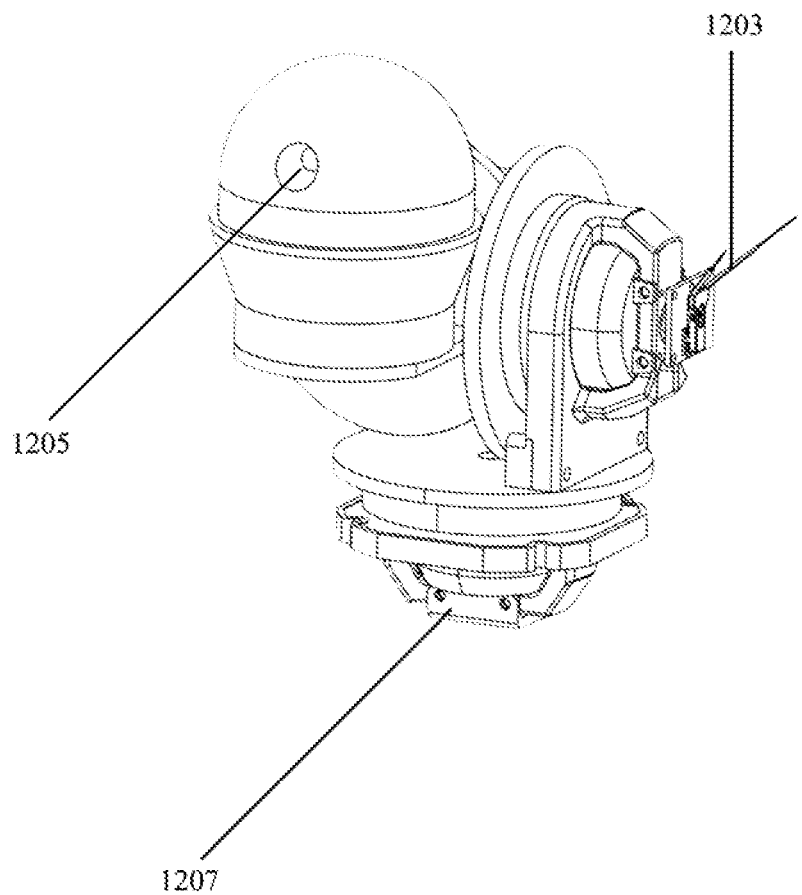
FIG. 12 illustrates an exemplary AI robot, in accordance with at least one embodiment.

FIG. 12 illustrates an exemplary AI robot, in accordance with at least one embodiment. FIG. 12 depicts a camera lens 1203, gimbal 1205, and antenna 1207.

Figure 13A:
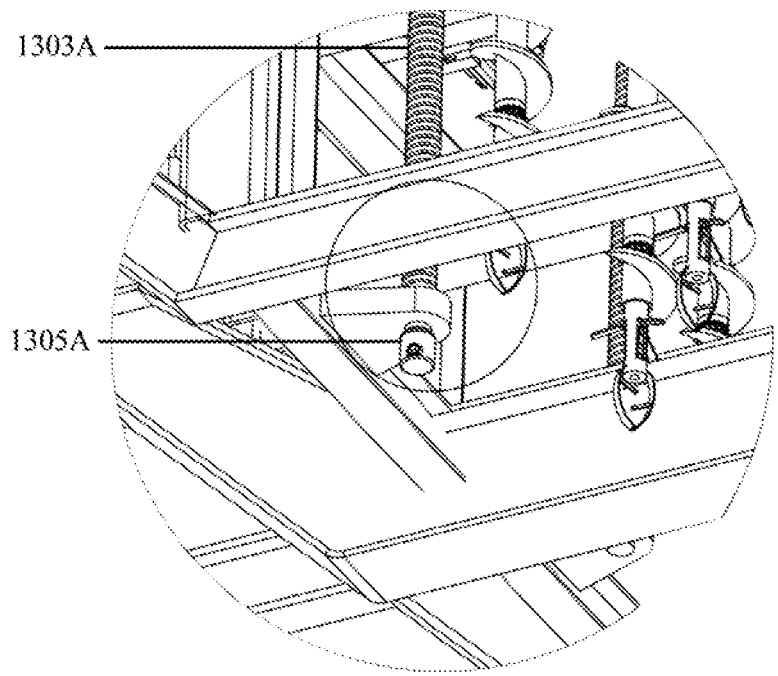
FIG. 13A illustrates an exemplary encoder for lead screw revolution counting, in accordance with at least one embodiment.

FIG. 13A illustrates an exemplary encoder for lead screw revolution counting, in accordance with at least one embodiment. FIG. 13A depicts a lead screw 1303A, and encoder 1305A.

Figure 13B:
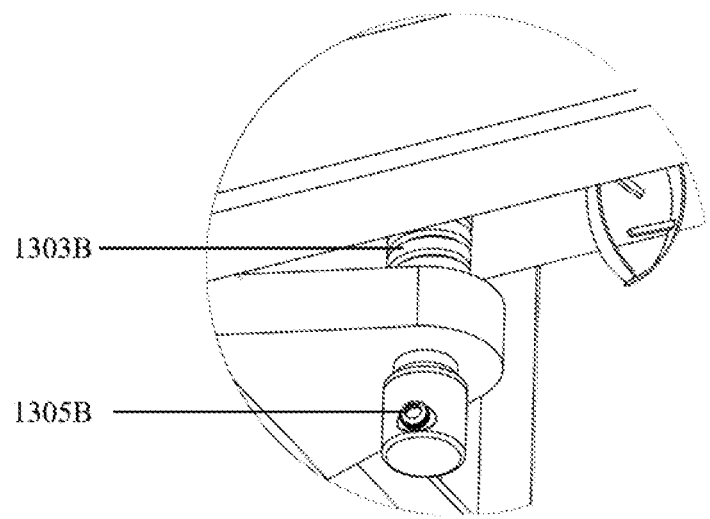
FIG. 13B illustrates an exemplary view of FIG. 13A of an encoder for lead screw revolution counting, in accordance with at least one embodiment.

FIG. 13B illustrates an exemplary view of FIG. 13A of an encoder for lead screw revolution counting, in accordance with at least one embodiment. FIG. 13B depicts a lead screw 1303B, and encoder 1305B.

Figure 14:
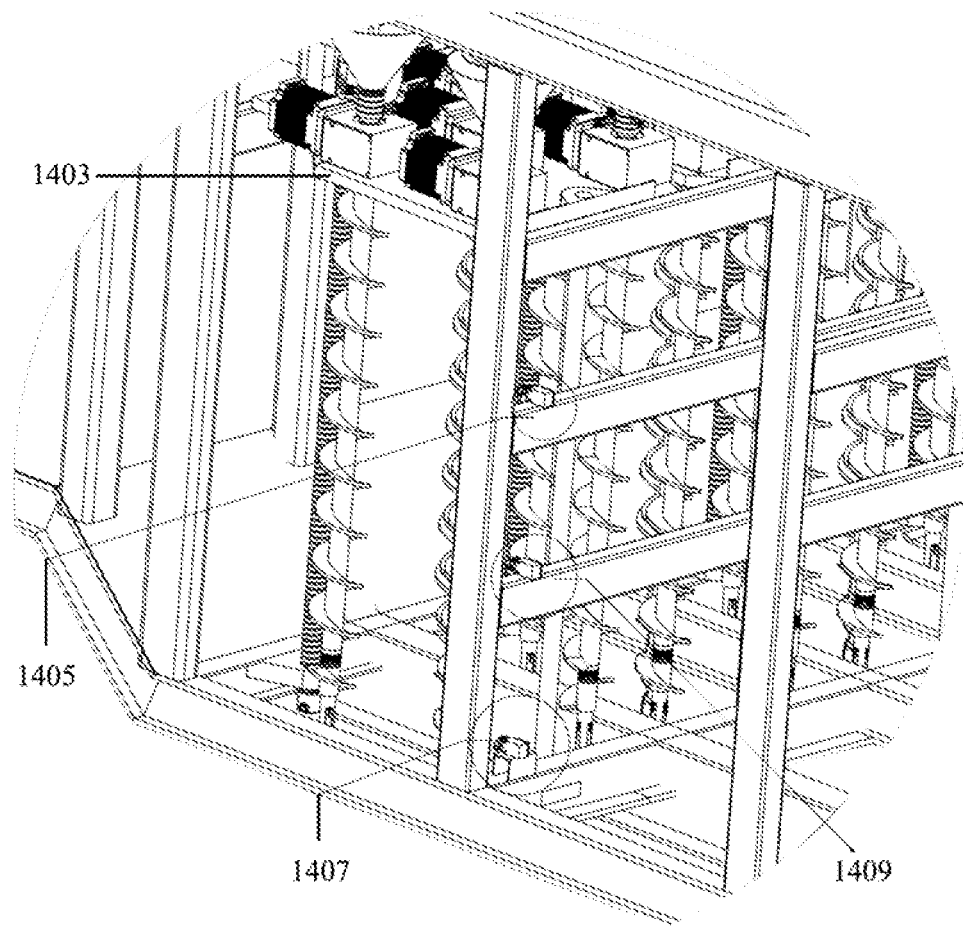
FIG. 14 illustrates an exemplary view of three limit switches, in accordance with at least one embodiment.

FIG. 14 illustrates an exemplary view of three limit switches, in accordance with at least one embodiment. FIG. 14 depicts an injection drill bit array platform 1403, a first limit switch 1405, a second limit switch 1407, and a limit switch 1409.

Figure 15A:
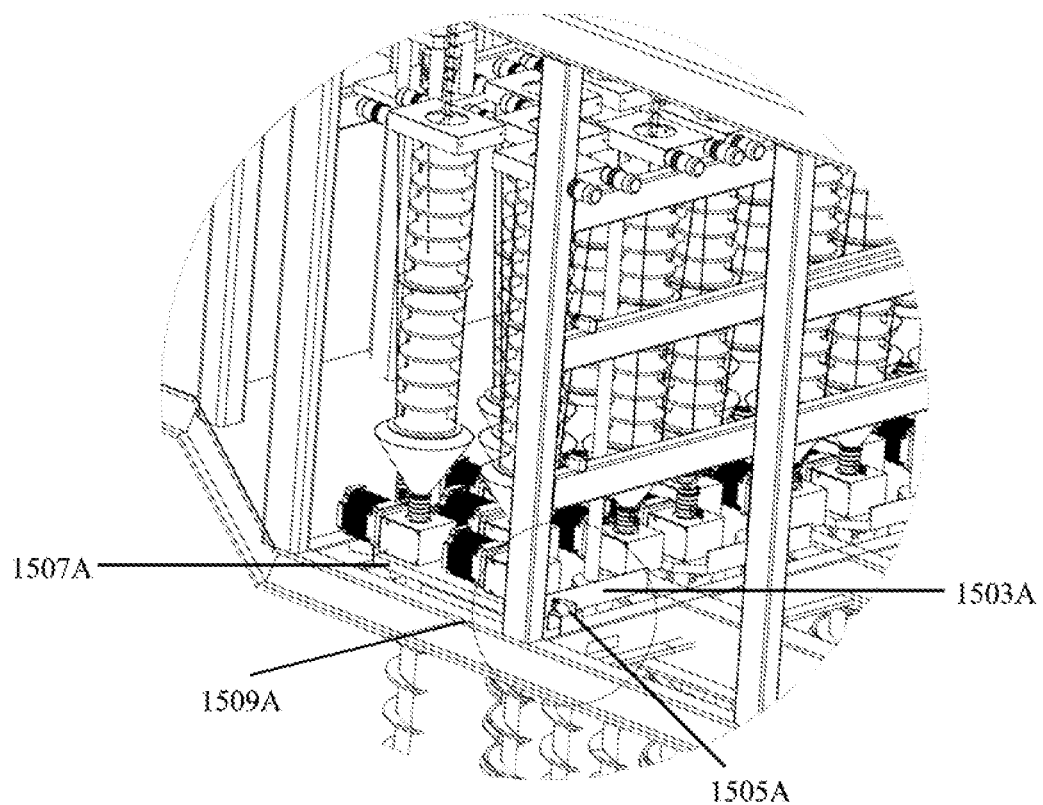
FIG. 15A illustrates an exemplary view of the limit switch that has been tripped by the injection drilling array platform having traveled to its limit setting, in accordance with at least one embodiment.

FIG. 15A illustrates an exemplary view of the limit switch that has been tripped by the injection drilling array platform having traveled to its limit setting, in accordance with at least one embodiment. FIG. 15A depicts a back wall of drilling array platform 1503A, a limit switch 1505A, a drilling array platform 1507A, and a call out 1509A for close up of FIG. 10B.

Figure 15B:
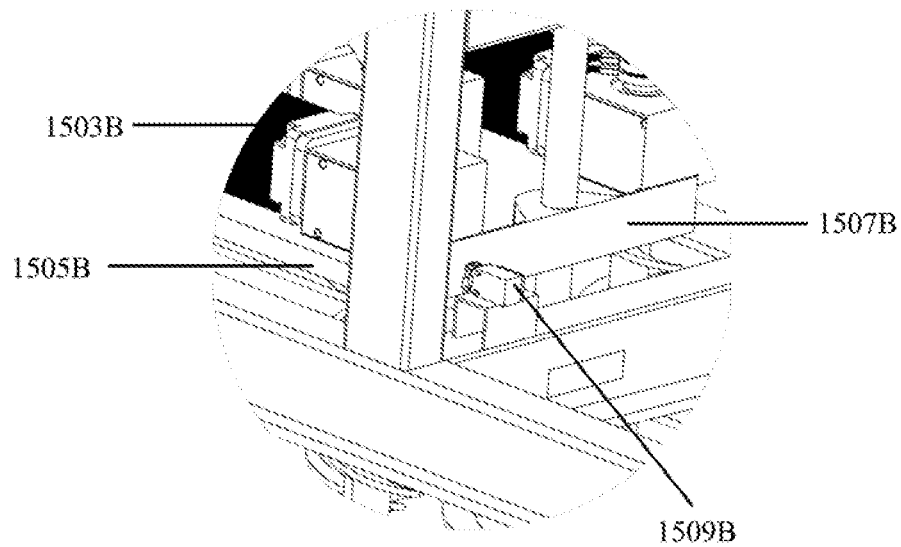
FIG. 15B illustrates an exemplary view of FIG. 15A, in accordance with at least one embodiment.

FIG. 15B illustrates an exemplary view of FIG. 15A, in accordance with at least one embodiment. FIG. 158 depicts a close-up 1503B of FIGS. 10A and 1009A, a drilling array platform 1505B, a back wall of drilling array platform 1507B, and a limit switch 1509B.

Figure 16A:
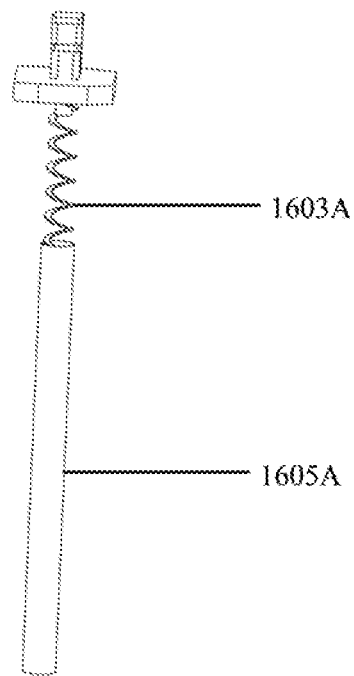
FIG. 16A illustrates an exemplary view of feeder auger flexible conveyor wire screw and conduit tube, in accordance with at least one embodiment.

FIG. 16A illustrates an exemplary view of feeder auger flexible conveyor wire screw and conduit tube, in accordance with at least one embodiment. FIG. 16A depicts a feeder auger flexible conveyor wire screw 1603A, a conduit tube 1605A, and a flight auger-feeder auger motor 1607A.

Figure 16B:
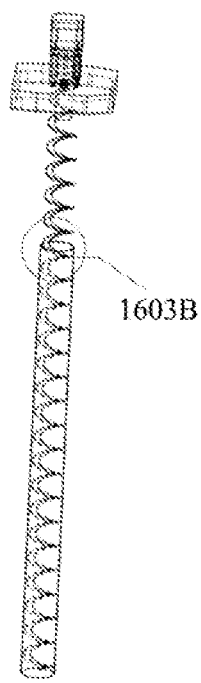
FIG. 16B illustrates an exemplary view of feeder auger flexible conveyor wire screw and transparent conduit tube, in accordance with at least one embodiment.

FIG. 16B illustrates an exemplary view of feeder auger flexible conveyor wire screw and transparent conduit tube, in accordance with at least one embodiment. FIG. 16B depicts a transparent conduit tube 1603B.

Figure 16C:
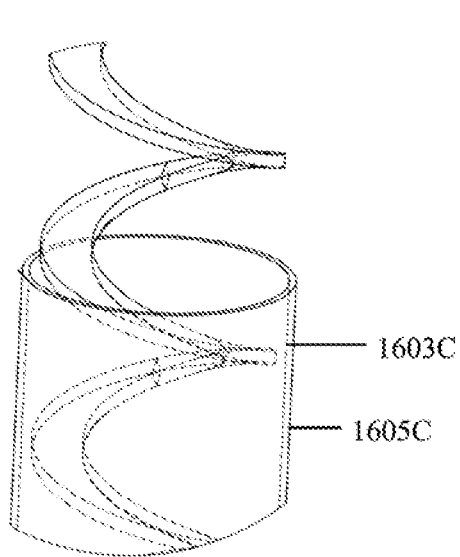
FIG. 16C illustrates a close-up view of an exemplary feeder auger flexible conveyor wire screw with a transparent conduit tube and an inner wall of hollow shaft injection drill bit, in accordance with at least one embodiment.

FIG. 16C illustrates a close-up view of an exemplary feeder auger flexible conveyor wire screw with a transparent conduit tube and an inner wall of hollow shaft injection drill bit, in accordance with at least one embodiment. FIG. 16C depicts an outer dimension wall of a transparent conduit tube 1603C, and an inner dimension wall of a hollow shaft drill bit 1605C.

Figure 16D:
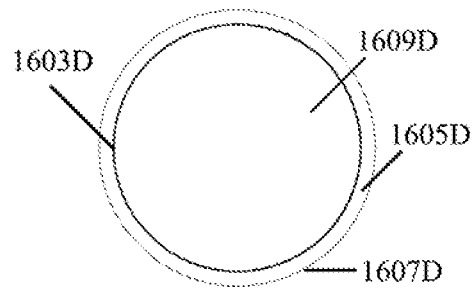
FIG. 16D illustrates a close-up view of an exemplary top view of feeder auger flexible conveyor wire screw and transparent conduit tube hollow chamber(s) for wires, in accordance with at least one embodiment.

FIG. 16D illustrates a close-up view of an exemplary top view of feeder auger flexible conveyor wire screw and transparent conduit tube hollow chamber(s) for wires, in accordance with at least one embodiment. FIG. 16D depicts an inner dimension wall of a transparent conduit tube 1603D, a cavity wire area between 1603D and 1607D wall of a transparent tube for constituents 1605D, and an outer dimension wall of a transparent tube 1607D for constituents, and a cavity 1609D for feeder auger.

Figure 16E:
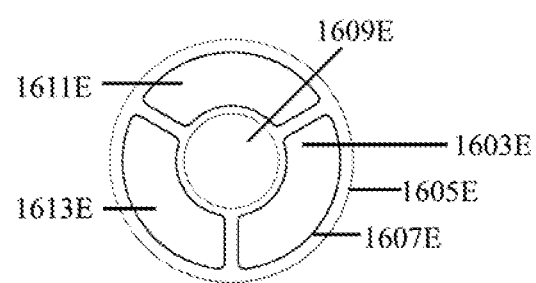
FIG. 16E illustrates a close-up view of an exemplary top view of feeder auger flexible conveyor wire screw and transparent conduit tube hollow chamber(s) for wires, in accordance with at least one embodiment.

FIG. 16E illustrates a close-up view of an exemplary top view of feeder auger flexible conveyor wire screw and transparent conduit tube hollow chamber(s) for wires, in accordance with at least one embodiment. FIG. 16E depicts a cavity wire area 1603E between 1603d and 1607d wall of a transparent tube for constituents, an outer dimension wall of a transparent tube 1605E for constituents, outer dimension wall 1607E of 1603E, a cavity 1609E for feeder auger, a cavity wire area 1611E between 1603D and 1607D wall of a transparent tube for constituents, and cavity wire area 1613E between 1603D and 1607D wall of a transparent tube for constituents.

Further, the present specification related to the sub-surface injection system for subsurface blending and horizon creation is described in conjunction with the FIGS. 1A-15B. The sub-surface injection system includes a plurality of wings (105B, 519A, 511C, 513C, 519C), a plurality of partially actuated mixing wings (205B, 309A, 411C, 419C, 511A, 519A, 511B, 513B, and 521B), an electromagnet (FIG. 6B), an artificial intelligence (AI) robot (107C), a lens (1205), a computer (1111C), a programmable logic controller (PLC) (1105C), an encoder (1305B), a limit switch (1409B), and a Global Positioning System (GPS) (1113C). The wings (105B) are actuated by the electromagnet (FIG. 6B). The wings (105B) include a plurality of blades (911B, 913B, and 915B), the partially actuated mixing wings (513B) during descension and/or ascension, and a plurality of industrial diamonds or blades to cut through sub-surface impediments comprising one or more of a plurality of invasive species live roots, dead roots, hardened soil, clays, and rocks. The wings (105B, 519A, 511C, 513C, 519C) are controlled by the artificial intelligence (AI) robot (1107C), the lens (1205), the computer (1111C), the PLC (1105C), the encoder (1305B), the limit switch (1409B), and the sensor. The wings (511C, 513C, 519C) exist within a below portion or an above portion of a hollow shaft drilling array and are individually controlled by one or more of the artificial intelligence (AI) robot (1107C), the lens (1205), the computer (1111C), the PLC (1105C), the encoder (1305B), the limit switch (1409B), and the sensor. The wings (511C) include a secondary deployable blade to enhance cutting or reaming through an impediment comprising clays and rock. The wings (519A) integrate a plurality of sensors based on Lidar technology. The sensors receive commands and signals from the AI robot (1107C), the lens (1205), the computer (1111C), and PLC (1105C), the encoder (1305B), the limit switch (1409B). The wings (105B, 519A, 511C, 513C, 519C) are deployed based on the data about soil type and amendment prescription received from the GPS (1113C).

In an embodiment, the wings (105B) are partially deployable at angles less than 180 degrees to blend material within a smaller circumferential sub-surface soil horizon.

In an embodiment, the wings (205B) are fully deployable at angles of 180 degrees to blend material within a smaller circumferential sub-surface soil horizon.

In an embodiment, the wings (513C) are deployed at certain prescriptive depths and then retracted before ascension.

In an embodiment, the wings (513C) are deployed at certain prescriptive depths and then retracted upon surface achievement.

In an embodiment, the wings (513C) enable continuous mixing of constituents with soil.

In an embodiment, the wings (513C) are deployed at any sub-surface depth descending.

In an embodiment, the wings (105B) are retracted at any sub-surface depth as a hollow shaft injection drill bit (503B) descends.

In an embodiment, the wings (105B) retracted at any sub-surface depth as the hollow shaft injection drill bit (503B) ascends.

In an embodiment, the wings (513C) are extended at any sub-surface depth as the hollow shaft injection drill bit (503B) ascends, wherein ascension starts at one or more non-actuated mixing wings (411B), then proceeds to the partially actuated mixing wings (411C) and then fully extended at the wings (513C).

In an embodiment, the non-actuated mixing wings (411B) are disabled within an array when in proximity to a known root zone or a Lidar map communicated from the GPS (1113C) coordinates in concert with the AI robot (1107C) and the lens (1205), the computer (1111C) and the PLC (1105C), the encoder (1305B), the limit switch (1409B) and the sensor.

In an embodiment, the wings (513C) change the densities of soil to positively affect the yield by mixing different dispensed bulk density constituents.

In an embodiment, the wings (513C) perform mixing a change in the porosity and the soil gravimetric profile occurs by adding a Constituent that has substantially less bulk density and subsequent.

In an embodiment, the wings (513C) perform mixing of the constituents and soil to create ideal soil bulk densities. In this case, the mixing would be done with wings that do not cut—dull wings—no diamonds.

In an embodiment, the wings (513C) are fully extended to enable mixing for the maximum area between injection drill bits.

In an embodiment, the wings (511C) enable blending by ejection of material from an aperture or a cap (507B) and rising above the material and then descending back to the depth of strata with the wings (513C) or the partially actuated mixing wings (513B) during descent.

In an embodiment, the wings (511C) enable blending by ejection of material from the aperture or the cap (507B) and descending below the material and then ascending back to the depth of strata with the wings (513C) or the partially actuated mixing wings (513B) during ascension.

In an embodiment, the wings enable partially actuated mixing wings (411C) to control the sub-surface area being treated within a specific depth.

In an embodiment, the non-actuated mixing wings (411B) are retracted when live material is injected, by way of example but not limitation earthworms.

In an embodiment, the partially actuated mixing wings (411C) are partially deployed to be less destructive of injectable live organisms.

In an embodiment, the partially actuated mixing wings (411C) enable the mixing of organic matter with other constituents for soil nutrient efficacy.

In an embodiment, the non-actuated mixing wings (411B) are deployed and retracted at desired depths and applying signals from the (AI) robot (1107C), the lens (1205), the computer (1111C), the PLC (1105C), the encoder (1305B), and the limit switch (1409B) to command the dispensing mechanism to reduce or increase the volumes of one or more Constituents to be mixed and or blended.

In an embodiment, the partially actuated mixing wings (511B, 513B, 521B) are partially deployed so the circumferential area is less to mitigate root damage.

In an embodiment, the wings (511C) enable the prevention of smearing through the distribution of abrasive organic matter.

In an embodiment, the wings (511C) enable discrete root ball destruction of unwanted, invasive, or nuisance plants or trees, such as certain Juniper tree species.

In an embodiment, the wings (511C) enable the addition of the constituents with multiple injections by deployment and retraction of wings at desired depths and applying signals from the (AI) robot (1107C), the lens (1205), the computer (1111C), the PLC (1105C), the encoder (1305B), and the limit switch (1409B) to command the dispensing mechanism to increase the volumes of the constituents to be mixed and blended.

In an embodiment, the wings (511C) enable eco-colonization of the living constituents comprising microbial colonies and fungi by dispersal within an extended diameter of the core injection.

In an embodiment, the wings (511C) exploit variable rotational speeds of wings through the signals from the (AI) robot (1107C), the lens (1205), the computer (1111C), the PLC (1105C), the encoder (1305B), and the limit switch (1409B).

In an embodiment, the wings (511C) blend, stir, entrain and agitate utilizing ascension of the hollow shaft injection drill bit (503C) and then descending the constituents with soil at that sub-surface depth.

In an embodiment, the partially actuated mixing wings (511A) enable universal and uniform sub-surface distribution of constituents vertically and horizontally.

In an embodiment, the wings (523C) enable the exploitation of a singular or multiple fixed-wing(s) to mix or blend constituents into soils.

In an embodiment, the partially actuated mixing wings (519A) change soil porosity modification as a function of the shape and size of solid constituents by mixing aggregates affecting the bulk mass density of the targeted horizon.

In an embodiment, the non-actuated mixing wings (411B) are retracted before injection of living constituents comprising aneic earthworms to improve porosity by penetrating below subsoil.

In an embodiment, the wings (519A) mix organic matter such as leaves subsurface for food and then retracted the non-actuated mixing wings (411B) before injection of the living constituents.

In an embodiment, the wings (519A) are deployed via the encoder (1305B) revolutions per minute resistance, sensor, AI robot (1107C) and lens (1205), computer (1111C) and the PLC (1105C) utilizes a database of soil type porosity and tightness dynamically interpreting resistance to the hollow shaft injection drill bit to initiate wings (519A) deployment to mitigate obstacle.

In an embodiment, the sub-surface injection system includes a plurality of bayonet mixing wings (415C, 417C) for mixing in looser soils that may reside within or on the exterior of a bayonet and another drill bit type.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

FIG. 1A
103A Call Out of Close Up of FIG. 1B
111A Electromagnet that Actuates FIG. 1B call-out #105B
FIG. 1B
103B Tip of Injection Drilling Auger
105B Non-Actuated Mixing Wings
107B Rib of Injection Drilling Auger

109B Connection Shaft of Injection Drilling Auger
FIG. 2A
203A Call Out of Close Up of FIG. 1B
211A Electromagnet that Actuates FIG. 2B call out #205B
FIG. 2B
203B Tip of Injection Drilling Auger
205B Partially Actuated Mixing Wings
207B Rib of Injection Drilling Auger
209B Connection Shaft of Injection Drilling Auger
FIG. 3A
307A Rib of Injection Drilling Auger
309A Partially Actuated Mixing Wings
311A Tip of Injection Drilling Auger
313A Connection Shaft of injection Drilling Auger
FIG. 3B
307B Rib of Injection Drilling Auger
309B Connection Shaft of Injection Drilling Auger
311B Fully Actuated Mixing Wings
313B Tip of Injection Drilling Auger
FIG. 4A
403A Electromagnet that Actuates FIG. 1B call-out #105B
405A Call Out of Close Up of FIG. 113 and FIG. 4C
FIG. 4B
409B Connection Shaft of Injection Drilling Auger
411B Non-Actuated Mixing Wings
413B Bayonet Claw
415B Bayonet Mixing Wing
419B Bayonet Mixing Wing
FIG. 4C
405C Rib of Injection Drilling Auger
409C Connection Shaft of Injection Drilling Auger
411C Partially Actuated Mixing Wings
413C Bayonet
415C Bayonet Mixing Wing
417C Bayonet Mixing Wing
419C Partially Actuated Mixing Wings
FIG. 5A
503A Perforated Shaft of Injection Drilling Auger
505A Non-Perforated Portion of Hollow Shaft of Injection Drilling Auger
507A Spring Loaded Cap of Hollow Perforated Shaft Injection Drilling Auger
509A Rib of Injection Drilling Auger
511A Partially Actuated Mixing Wings
513A Bayonet Mixing Wing
515A Bayonet
517A Bayonet Mixing Wing
519A Partially Actuated Mixing Wings
521A Collar Guard with Rectangular Windows
FIG. 5B
503B Non-Perforated Hollow Shaft of Injection Drilling Auger
505B Top of Collar Guard
507B Spring Loaded Cap of Hollow Perforated Shaft Injection Drilling Auger
509B Rib of Injection Drilling Auger
511B Partially Actuated Mixing Wings
513B Partially Actuated Mixing Wings
515B Bayonet Mixing Wing
517B Bayonet
519B Bayonet Mixing Wing
521B Partially Actuated Mixing Wings
523B Collar Guard with Rectangular Windows
FIG. 5C
503C Perforated Shaft of Injection Drilling Auger
505C: Non-Perforated Shaft Area of Injection Drilling Auger
507C Rib of Injection Drilling Auger
509C Spring Loaded Cap of Hollow Perforated Shaft Injection Drilling Auger
511C Fully Actuated Mixing Wings
513C Fully Actuated Mixing Wings
515C Bayonet Mixing Wing
517C Bayonet
519C Fully Actuated Mixing Wings
521C Bayonet Mixing Wing
523C Spillway
525C Guard with Rectangular Windows
FIG. 6A
603A Call Out for Close Up of FIG. 6B
605A Shaft of Hollow Injection Drilling Auger
607A Perforation of Hollow Injection Drilling Auger
609A Rib of Hollow Injection Drilling Auger
611A Bayonet
613A Deployed Mixing Wing
FIG. 6B
601B Copper Band
603B Insulation
605B Carbon Brush
607B Spring
609B Protective Enclosure
611B Positive Wire
613B Negative Wire
615B Protective Enclosure
4617B Spring
619B Carbon Brush
621B Shaft of Injection Drilling Auger
623B Carbon Brush
625B Spring
627B Protective Enclosure
629B Positive Wire
631B Negative Wire
633B Protective Enclosure
635B Spring
637B Carbon Brush
FIG. 7A
703A Call Out for Close Up of FIG. 7B
705A Shaft of Hollow Injection Drilling Auger
707A Perforation of Hollow Injection Drilling Auger
709A Rib of Hollow Injection Drilling Auger
711A Bayonet
FIG. 7B
703B Negative Wire
705B Positive Wire
707B Insulation
709B Copper Band
711B Carbon Brush
713B Spring
715B Protective Enclosure
717B Positive Wire
719B Protective Enclosure
721B Negative Wire
723B Spring
725B Carbon Brush
727B Copper Band
729B Insulation
FIG. 8A
803A Electromagnet
809A Rib of Hollow Injection Drilling Auger
811A Call Out for Close Up of Cross Section of FIG. 8B
FIG. 8B
811B Rib of Hollow Injection Drilling Auger

813B Deployed Actuated Mixing Wing
8115B Mixing Blade
817B Bayonet
FIG. 9A
903A Cone Shape Cap for Spillway
905A Collar
907A Enclosure
909A Arm Mount Pin
911A Wing Non-Actuated
913A Socket Attachment for Injection Drill Bit
FIG. 9B
903B Electromagnet Coil
905B Spring
907B Spring Arm Mounting Disk
909B Assembly Close-Up of FIG. 9C
911B Wing Partially Actuated
913B Wing Tip With Blade Edge Partially Actuated
915B Wing With Blade Side Edge Partially Actuated
917B Wing Mount Arm
919B Wires
FIG. 9C
903C Spring
905C Spring Arm Mounting Disk
907C Arm Mount Pin
909C Wing Mount Pin
911C Wing Partially Actuated
913C Wing Without Blade Tip Partially Actuated
915C Under Side of Wing Partially Actuated
917C Wing Mount Arm Partially Actuated
919C Side of Wing Partially Actuated
FIG. 10A
1003A Positive Negative Wires
1005A Cap in the Shape of a Cone
1007A Cap Rim
1009A Shaft of Device
1011A Wing Blade Mount Arm
1013A Wing Blade Partially Extended
1015A Wing Blade Housing Cavity
1017A Wing Blade Partially Extended
FIG. 10B
1001B Positive Negative Wires
1003B Cap in the Shape of a Cone
1005B Cap Rim
1007B Shaft of Device
1009B Coil
1011B Spring
1013B Wing Blade Mount Arm
1017B Cylinder Male mate to the underside of FIG. 10B #1015B acting as a stop
1019B Drill Bit Mounting Cavity and or motorized wing deployment alternate method power unit
1021B Wing Blade Partially Extended
1023B Wing Blade Partially Extended
FIG. 10C
1003C Positive Negative Wires
1005C Cap in the Shape of a Cone
1007C Cap Rim
1009C Shaft of Device
1011C Coil
1013C Spring
1015C Platform
1017C Wing Blade Partially Extended
1019C Cylinder Male mate to the underside of FIG. 10C #1017C acting as a stop
1021C Shaft of Device
1023C Drill Bit Mounting Cavity and or motorized wing deployment alternate method power unit
1025C Wing Blade Arm Mount Pin
1027C Wing Blade Partially Extended
FIG. 11A
1103A Satellite Communications Dish
1105A Communications Platform containing components seen in FIG. 11C
FIG. 11B
1103B Satellite Communications Dish
FIG. 1C
1103C Fuel Cell
1105C PLC
1107C AI Robot
1109C Router
1111C Computer
1113C GPS
FIG. 12
1203 Camera Lens
1205 Gimbal
1207 Antenna
FIG. 13A
1303A Lead Screw
1305A Encoder
FIG. 13B
1303B Lead Screw
1305B Encoder
FIG. 14
1403 Injection Drill Bit Array Platform
1405 Limit Switch
1407 Limit Switch
1409 Limit Switch
FIG. 15A
1503A Back Wall of Drilling Array Platform
1505A Limit Switch
1507A Drilling Array Platform
1509A Call Out for Close Up of FIG. 10B
FIG. 15B
1503B Close Up of FIG. 10A and #1009A
1505B Drilling Array Platform
1507B Back Wall of Drilling Array Platform
1509B Limit Switch
FIG. 16A
1603A Feeder Auger Flexible Conveyor Wire Screw
1605A Conduit Tube
1607A Flight Auger-Feeder Auger Motor
FIG. 16B
1603B Transparent Conduit Tube
FIG. 16C
1603C Outer Dimension Wall of a Transparent Conduit Tube
1605C Inner Dimension Wall of a Hollow Shaft Drill Bit
FIG. 16D
1603D Inner Dimension Wall of a Transparent Conduit Tube
1605D Cavity Wire Area between #1603D and #1607D Wall of a Transparent Tube for Constituents
1607D Outer Dimension Wall of a Transparent Tube for Constituents
1609D Cavity for Feeder Auger
FIG. 16E
41603E Cavity Wire Area between #1603D and #1607D Wall of a Transparent Tube for Constituents
1605E Outer Dimension Wall of a Transparent Tube for Constituents

1607E Outer Dimension Wall of #1603E
1609E Cavity for Feeder Auger
1611E Cavity Wire Area between #1603D and #1607D Wall of a Transparent Tube for Constituents
1613E Cavity Wire Area between #1603D and #1607D Wall of a Transparent Tube for Constituents

The invention claimed is:

1. A sub-surface injection system for subsurface blending and horizon creation, comprising:
a plurality of wings (105B, 519A, 511C, 513C, 519C);
a plurality of partially actuated mixing wings (205B, 309A, 411C, 419C, 511A, 519A, 511B, 513B, and 521B);
an electromagnet, wherein the wings (105B) are actuated by the electromagnet (FIG. 6B), wherein the wings (105B) comprise a plurality of blades (911B, 913B, and 915B), the partially actuated mixing wings (513B) during descension and/or ascension, and a plurality of industrial diamonds or blades to cut through sub-surface impediments comprising one or more of a plurality of invasive species live roots, dead roots, hardened soil, clays, and rocks;
an artificial intelligence (AI) robot (1107C);
a lens (1205);
a computer (1111C);
a programmable logic controller (PLC) (1105C);
an encoder (1305B);
a limit switch (1409B);
a sensor, wherein the plurality of wings (105B, 519A, 511C, 513C, 519C) are controlled by the artificial intelligence (A) robot (1107C), the lens (1205), the computer (1111C), the PLC (1105C), the encoder (1305B), the limit switch (1409B), and the sensor,
wherein the plurality of wings (511C, 513C, 519C) exist within a below portion or an above portion of a hollow shaft drilling array and are individually controlled by one or more of the artificial intelligence (AI) robot (1107C), the lens (1205), the computer (1111C), the PLC (1105C), the encoder (1305B), the limit switch (1409B), and the sensor,
wherein the plurality of wings (511C) include a secondary deployable blade to enhance cutting or reaming through an impediment comprising clays and rock,
wherein the plurality of wings (519A) integrate a plurality of sensors based on Lidar technology, wherein the sensors receive commands and signals from the AI robot (1107C), the lens (1205), the computer (1111C), and PLC (1105C), the encoder (1305B), the limit switch (1409B), and
a Global Positioning System (GPS) (1113C), wherein the plurality of wings (105B, 519A, 511C, 513C, 519C) are deployed based on the data about soil type and amendment prescription received from the GPS (1113C).

2. The sub-surface injection system as claimed in claim 1, wherein the wings (105B) are partially deployable at angles less than 180 degrees to blend material within a smaller circumferential sub-surface soil horizon.

3. The sub-surface injection system as claimed in claim 1, wherein the wings (205B) are fully deployable at angles of 180 degrees to blend material within a smaller circumferential sub-surface soil horizon.

4. The sub-surface injection system as claimed in claim 1, wherein the wings (513C) are deployed at certain prescriptive depths and then retracted before ascension.

5. The sub-surface injection system as claimed in claim 1, wherein the wings (513C) are deployed at certain prescriptive depths and then retracted upon surface achievement.

6. The sub-surface injection system as claimed in claim 1, wherein the wings (513C) enable continuous mixing of constituents with soil.

7. The sub-surface injection system as claimed in claim 1, wherein the wings (513C) are deployed at any sub-surface depth descending.

8. The sub-surface injection system as claimed in claim 1, wherein the wings (105B) are retracted at any sub-surface depth as a hollow shaft injection drill bit (503B) descends.

9. The sub-surface injection system as claimed in claim 1, wherein the wings (105B) retracted at any sub-surface depth as the hollow shaft injection drill bit (503B) ascends.

10. The sub-surface injection system as claimed in claim 1, wherein the wings (513C) are extended at any sub-surface depth as the hollow shaft injection drill bit (503B) ascends, wherein ascension starts at one or more non-actuated mixing wings (411B), then proceeds to the partially actuated mixing wings (411C) and then fully extended at the wings (513C).

11. The sub-surface injection system as claimed in claim 1, wherein the non-actuated mixing wings (411B) are disabled within an array when in proximity to a known root zone or a Lidar map communicated from the GPS (1113C) coordinates in concert with the AI robot (1107C) and the lens (1205), the computer (1111C) and the PLC (1105C), the encoder (1305B), the limit switch (1409B) and the sensor.

12. The sub-surface injection system as claimed in claim 1, wherein the wings (513C) change the densities of soil to positively affect the yield by mixing different dispensed bulk density constituents.

13. The sub-surface injection system as claimed in claim 1, wherein the wings (513C) perform mixing a change in the porosity and the soil gravimetric profile occurs by adding a Constituent that has substantially less bulk density and subsequent.

14. The sub-surface injection system as claimed in claim 1, wherein the wings (513C) perform mixing of the constituents and soil to create ideal soil bulk densities.

15. The sub-surface injection system as claimed in claim 1, wherein the wings (513C) are fully extended to enable mixing for the maximum area between injection drill bits.

16. The sub-surface injection system as claimed in claim 1, wherein the wings (511C) enable blending by ejection of material from an aperture or a cap (507B) and rising above the material and then descending back to the depth of strata with the wings (513C) or the partially actuated mixing wings (513B) during descent.

17. The sub-surface injection system as claimed in claim 1, wherein the wings (511C) enable blending by ejection of material from the aperture or the cap (507B) and descending below the material and then ascending back to the depth of strata with the wings (513C) or the partially actuated mixing wings (513B) during ascension.

18. The sub-surface injection system as claimed in claim 1, wherein the wings enable partially actuated mixing wings (411C) to control the sub-surface area being treated within a specific depth.

19. The sub-surface injection system as claimed in claim 1, wherein the non-actuated mixing wings (411B) are retracted when live material is injected, by way of example but not limitation earthworms.

20. The sub-surface injection system as claimed in claim 1, wherein the partially actuated mixing wings (411C) partially deploy to be less destructive of injectable live organisms.

21. The sub-surface injection system as claimed in claim 1, wherein the partially actuated mixing wings (411C) enable the mixing of organic matter with other constituents for soil nutrient efficacy.

22. The sub-surface injection system as claimed in claim 1, wherein the non-actuated mixing wings (411B) are deployed and retracted at desired depths, and applying signals from the (AI) robot (1107C), the lens (1205), the computer (1111C), the PLC (1105C), the encoder (1305B), and the limit switch (1409B) to command the dispensing mechanism to reduce or increase the volumes of one or more Constituents to be mixed and or blended.

23. The sub-surface injection system as claimed in claim 1, wherein the partially actuated mixing wings (511B, 513B, 521B) are partially deployed so the circumferential area is less to mitigate root damage.

24. The sub-surface injection system as claimed in claim 1, wherein the wings (511C) enable the prevention of smearing through the distribution of abrasive organic matter.

25. The sub-surface injection system as claimed in claim 1, wherein the wings (511C) enable discrete root ball destruction of unwanted, invasive, or nuisance plants or trees, such as certain Juniper tree species.

26. The sub-surface injection system as claimed in claim 1, wherein the wings (511C) enable the addition of the constituents with multiple injections by deployment and retraction of wings at desired depths and applying signals from the (A) robot (1107C, the lens (1205) the computer (1111C), the PLC (1105C), the encoder (1305B), and the limit switch (1409B) to command the dispensing mechanism to increase the volumes of the constituents to be mixed and blended.

27. The sub-surface injection system as claimed in claim 1, wherein the wings (511C) enable eco-colonization of the living constituents comprising microbial colonies and fungi by dispersal within an extended diameter of the core injection.

28. The sub-surface injection system as claimed in claim 1, wherein the wings (511C) exploit variable rotational speeds of wings through the signals from the (AI) robot (1107C), the lens (1205), the computer (1111C), the PLC (1105C), the encoder (1305B), and the limit switch (1409B).

29. The sub-surface injection system as claimed in claim 1, wherein the wings (511C) blend, stir, entrain and agitate utilizing ascension of the hollow shaft injection drill bit (503C) and then descending the constituents with soil at that sub-surface depth.

30. The sub-surface injection system as claimed in claim 1, wherein the partially actuated mixing wings (511A) enable universal and uniform sub-surface distribution of constituents vertically and horizontally.

31. The sub-surface injection system as claimed in claim 1, wherein the wings enable the exploitation of a singular or multiple fixed-wing(s) to mix or blend constituents into soils.

32. The sub-surface injection system as claimed in claim 1, wherein the partially actuated mixing wings (519A) change soil porosity modification as a function of the shape and size of solid constituents by mixing aggregates affecting the bulk mass density of the targeted horizon.

33. The sub-surface injection system as claimed in claim 1, wherein the non-actuated mixing wings (411B) are retracted before injection of living constituents comprising aneic earthworms to improve porosity by penetrating below subsoil.

34. The sub-surface injection system as claimed in claim 1, wherein the wings (519A) mix organic matter such as leaves subsurface for food and then retracted the non-actuated mixing wings (411B) before injection of the living constituents.

35. The sub-surface injection system as claimed in claim 1, wherein the wings (519A) are deployed via the encoder (1305B) revolutions per minute resistance, sensor, AI robot (1107C) and lens (1205), computer (1111C) and the PLC (1105C) utilizes a database of soil type porosity and tightness dynamically interpreting resistance to the hollow shaft injection drill bit to initiate wings (519A) deployment to mitigate obstacle.

36. The sub-surface injection system as claimed in claim 1, comprises a plurality of bayonet mixing wings (415C, 417C) for mixing in looser soils that may reside within or on the exterior of a bayonet and another drill bit type.

* * * * *